(12) United States Patent  
Keller

(10) Patent No.: US 9,642,014 B2  
(45) Date of Patent: May 2, 2017

(54) NON-CONTACT ELECTROMAGNETIC ILLUMINATED DETECTION OF PART ANOMALIES FOR CYBER PHYSICAL SECURITY

(71) Applicant: Nokomis, INC., Charleroi, PA (US)

(72) Inventor: Walter John Keller, Bridgeville, PA (US)

(73) Assignee: NOKOMIS, INC., Charleroi, PA (US)

( * ) Notice: Subject to any disclaimer, the term of this patent is extended or adjusted under 35 U.S.C. 154(b) by 0 days.

(21) Appl. No.: 14/694,542

(22) Filed: Apr. 23, 2015

(65) Prior Publication Data

US 2015/0358337 A1   Dec. 10, 2015

Related U.S. Application Data

(60) Provisional application No. 61/997,745, filed on Jun. 9, 2014.

(51) Int. Cl.
| | |
|---|---|
| *G06F 12/14* | (2006.01) |
| *H04L 9/32* | (2006.01) |

(Continued)

(52) U.S. Cl.
CPC ......... *H04W 12/12* (2013.01); *H04L 63/0876* (2013.01)

(58) Field of Classification Search
CPC ..................... H04W 12/12; H04L 63/0876

(Continued)

(56) References Cited

U.S. PATENT DOCUMENTS 4,263,595 A * 4/1981 Vogel ..................... B61L 25/04  
342/44  
5,218,294 A   6/1993 Soiferman  
(Continued)

FOREIGN PATENT DOCUMENTS

JP   06011530   1/1994  
JP   2000076387   3/2000  
(Continued)

OTHER PUBLICATIONS

Walter J. Keller and Bogdan A. Pathak; Advanced Detection of Electronic Counterfeit; Apr. 19, 2013; Nokomis, Inc.

(Continued)

*Primary Examiner* — Aravind Moorthy  
(74) *Attorney, Agent, or Firm* — James Ray and Assoc.LLC

(57) ABSTRACT

An apparatus for testing, inspecting or screening an electronic device for electrical characteristics, modified or unmodified hardware, or firmware modifications including Malware, Trojans, improper versioning, and the like, includes a transmitting antenna positioned at a distance from the electronic device and a electromagnetic energy receiver or sensor for examining a resulting unintentional derived electromagnetic energy from the electronic device. The receiver collects unintentional RF energy components emitted by the device and includes a processor and executable instructions that perform analysis in a response to the acquired electromagnetic energy input. The characteristics of the collected RF energy may be compared with RF energy characteristics of an exemplary device. The analysis determines one of a modified, unmodified or score of certainty of discerned condition of the device.

20 Claims, 15 Drawing Sheets

(51) Int. Cl.
*H04W 12/12* (2009.01)
*H04L 29/06* (2006.01)

(58) Field of Classification Search
USPC .................................. 726/23; 713/176, 194
See application file for complete search history.

(56) References Cited

U.S. PATENT DOCUMENTS

| | | | |
|---|---|---|---|
| 5,227,800 A | 7/1993 | Huguenin et al. | |
| 5,302,830 A | 4/1994 | Shivanandan | |
| 5,424,633 A | 6/1995 | Soiferman | |
| 5,517,110 A | 5/1996 | Soiferman | |
| 5,668,342 A | 9/1997 | Discher | |
| 5,714,888 A | 2/1998 | Naujoks | |
| 6,049,301 A | 4/2000 | Weagant | |
| 6,057,765 A | 5/2000 | Jones et al. | |
| 6,163,259 A | 12/2000 | Barsumian et al. | |
| 6,496,703 B1 | 12/2002 | da Silva | |
| 6,720,905 B2 | 4/2004 | Levitan et al. | |
| 6,759,863 B2 | 7/2004 | Moore | |
| 6,765,527 B2 | 7/2004 | Jablonski et al. | |
| 6,825,456 B2 | 11/2004 | Chadwick et al. | |
| 6,897,777 B2 | 5/2005 | Holmes et al. | |
| 6,927,579 B2 | 8/2005 | Blades | |
| 6,985,771 B2 | 1/2006 | Fischell et al. | |
| 7,130,624 B1 | 10/2006 | Jackson et al. | |
| 7,138,936 B2 | 11/2006 | Duff et al. | |
| 7,188,037 B2 | 3/2007 | Hidehira | |
| 7,391,356 B2 | 6/2008 | Brumley et al. | |
| 7,512,511 B1 | 3/2009 | Schultz et al. | |
| 7,515,094 B2 | 4/2009 | Keller, III | |
| 7,609,199 B2 | 10/2009 | Nishijima et al. | |
| 7,639,178 B1 | 12/2009 | Mulbrook et al. | |
| 7,777,671 B2 | 8/2010 | Schnitzer et al. | |
| 7,777,672 B2 | 8/2010 | Schnitzer et al. | |
| 7,844,341 B2 | 11/2010 | Von Arx et al. | |
| 8,063,813 B1 | 11/2011 | Keller | |
| 2005/0124307 A1* | 6/2005 | Ammar | H04B 1/38 455/183.2 |
| 2005/0265124 A1 | 12/2005 | Smith | |
| 2006/0049138 A1* | 3/2006 | Miyake | H01J 37/321 216/58 |
| 2006/0152232 A1 | 7/2006 | Shvets et al. | |
| 2007/0027643 A1 | 2/2007 | Lesesky et al. | |
| 2007/0229270 A1 | 10/2007 | Rofougaran | |
| 2007/0234058 A1 | 10/2007 | White | |
| 2007/0279071 A1 | 12/2007 | Orton | |
| 2008/0103555 A1 | 5/2008 | Dicks et al. | |
| 2008/0284609 A1 | 11/2008 | Rofougaran | |
| 2009/0099830 A1 | 4/2009 | Gross et al. | |
| 2009/0218657 A1 | 9/2009 | Rofougaran | |
| 2010/0033386 A1 | 2/2010 | Lewis et al. | |
| 2010/0123453 A1 | 5/2010 | Pauly et al. | |
| 2010/0125438 A1 | 5/2010 | Audet | |
| 2010/0237854 A1 | 9/2010 | Kumhyr et al. | |
| 2010/0241864 A1 | 9/2010 | Kelley et al. | |
| 2010/0332199 A1 | 12/2010 | Dhanekula et al. | |
| 2011/0031009 A1* | 2/2011 | Leegate | H05K 9/0018 174/382 |
| 2011/0320170 A1 | 12/2011 | Pathak et al. | |
| 2012/0179812 A1 | 7/2012 | Keller, III | |
| 2012/0223403 A1 | 9/2012 | Keller, III et al. | |
| 2012/0226463 A1 | 9/2012 | Keller, III et al. | |
| 2013/0082717 A1 | 4/2013 | Kim et al. | |
| 2013/0183897 A1* | 7/2013 | Cordier | G06F 1/1698 455/41.1 |
| 2014/0042337 A1* | 2/2014 | Biloiu | H01J 27/16 250/424 |
| 2015/0097754 A1* | 4/2015 | Petros | H01Q 1/362 343/895 |
| 2016/0138957 A1* | 5/2016 | Blodt | G01F 23/284 342/124 |

FOREIGN PATENT DOCUMENTS

| | | |
|---|---|---|
| JP | 2003503679 | 1/2003 |
| JP | 2011174709 | 9/2011 |
| JP | 2012026913 | 2/2012 |
| KR | 100946238 | 3/2010 |
| KR | 101077441 | 10/2011 |
| WO | 2009047585 | 4/2009 |

OTHER PUBLICATIONS

William E. Cobb, et al., Intrinsic Physical-Layer Authentication of Integrated Circuits, Leee Transactions on Information Forensics and Security, vol. 7, No. 1, Feb. 2012.

Ashwin Lakshminarasimhan, Electromagnetic Side-Channel Analysis for Hardware and Software Watermarking, Master of Science in Electrical and Computer Engineering; Sep. 2011.

Y.P. Zhang, Duixian Liu, Antenna-on-Chip and Antenna-in-Package Solutions to Highly Integrated Millimeter-Wave Devices for Wireless Communications, 2009, vol. 57 No. 10.

Y.P. Zhang, Duixian Liu, Antenna-on-chip and Antenna-in-Package Solutions to Highly Integrated Millimeter-Wave Devices for Wireless Communication, 2009, vol. 57 No. 10.

* cited by examiner

NON-CONTACT ELECTROMAGNETIC ILLUMINATED DETECTION OF PART ANOMALIES FOR CYBER PHYSICAL SECURITY

CROSS REFERENCE TO RELATED APPLICATIONS

This patent application is related to and claims priority from U.S. Provisional Patent Application Ser. No. 61/997,745 filed Jun. 9, 2014 and its disclosure is being incorporated into this document by reference thereto.

This document incorporates by reference the disclosures and/or teachings of the following documents: U.S. Pat. No. 7,515,094 ("Advanced electromagnetic location of electronic equipment"); U.S. Pat. No. 8,063,813 entitled "Active improvised explosive device (IED) electronic signature detection"; U.S. Pat. No. 8,537,050 entitled "Identification and analysis of source emissions through harmonic phase comparison"; U.S. Pat. No. 8,643,539 entitled "Advance manufacturing monitoring and diagnostic tool"; U.S. Pat. No. 8,825,823 entitled "System and method for physically detecting, identifying, diagnosing and geolocating electronic devices connectable to a network"; US Pub 20100123453 entitled "ADVANCE MANUFACTURING MONITORING AND DIAGNOSTIC TOOL"; US Pub. 20110320170 entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS"; US Pub. 20120179812 entitled "SYSTEM AND METHOD FOR PHYSICALLY DETECTING, IDENTIFYING, DIAGNOSING AND GEOLOCATING ELECTRONIC DEVICES CONNECTABLE TO A NETWORK"; US Pub. 20120223403 entitled "INTEGRATED CIRCUIT WITH ELECTROMAGNETIC ENERGY ANOMALY DETECTION AND PROCESSING"; US Pub. 20120226463 entitled "SYSTEM AND METHOD FOR PHYSICALLY DETECTING COUNTERFEIT ELECTRONICS"; US Pub. 20130229310 entitled "SYSTEM AND METHOD FOR GEO-LOCATING AND DETECTING SOURCE OF ELECTROMAGNETIC EMISSIONS"; U.S. Pub. Ser. No. 0110095934 entitled "IDENTIFICATION AND ANALYSIS OF SOURCE EMISSIONS THROUGH HARMONIC PHASE COMPARISON"; US Pub. 20130328710, entitled "Method and Apparatus for Detection and Identification of Counterfeit and Substandard Electronics"; U.S. Ser. No. 13/106,412 entitled "Method and Apparatus for the Diagnosis and Prognosis of Active Implants in or Attached to Biological Hosts or Systems"; U.S. Ser. No. 13/344,717 entitled System and Method for physically detecting, identifying, diagnosing and geolocating electronic devices connectable to a network"; U.S. Ser. No. 13/410,586 entitled "System and Method for Geolocating and Detecting Source of Electromagnetic Emissions"; U.S. Ser. No. 13/410,797 entitled "System and Method for Physically Detecting Counterfeit Electronics"; U.S. Ser. No. 13/410,909 entitled "Integrated Circuit with Electromagnetic Energy Anomaly Detection and Processing"; U.S. Ser. No. 13/712,031 entitled "Method and Apparatus for battle damage assessment of electric or electronic devices"); U.S. Ser. No. 14/199,687 entitled "Method and Apparatus for Detection and Identification of Counterfeit and Substandard Electronics", U.S. Ser. No. 14/141,653 entitled "Advance Manufacturing Monitoring and Diagnostic Tool"; PCT/US2015/014765 entitled "METHOD AND APPARATUS FOR DETECTION AND IDENTIFICATION OF COUNTERFEIT AND SUBSTANDARD ELECTRONICS", U.S. Ser. No. 14/329,160 entitled "System and Method for Physically Detecting, Identifying, Diagnosing and Geolocating Electronic Devices Connectable to a network", and U.S. Ser. No. 14/663,156, filed Mar. 19, 2015 entitled "DETECTION OF MALICIOUS SOFTWARE, FIRMWARE, IP CORES AND CIRCUITRY VIA UNINTENTIONAL EMISSIONS".

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates, in general, to an apparatus and method that uses radio frequency RF illumination of electrically powered devices to detect detailed configuration, quality, authenticity, status and state of electrical devices. It further relates to detecting modifications and/or changes in hardware, software, or firmware to the electrical device using unintentional electromagnetic energy emitted from the devices during non-contact RF illumination of the device. It additionally relates to recognition of anticipated, abnormal or unexpected changes, patterns and/or characteristics in the unintentional electromagnetic emissions given off by the electrically powered devices due to the effect of RF illumination.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, criminal elements have demonstrated a propensity to use modern electronic devices for illicit purposes. The ability to insert malicious circuitry into parts is well known. The fraudulent reuse of parts is well known. This invention provided a novel approach to detecting parts of this nature to prevent them from getting into and integrated in electronic products.

As stated in a recent Popular Science Article, "The more powerful our microchips, the more capabilities we have". But when such complexity is paired with massive scale, $333 billion-worth of chips were sold in 2014 alone, it also creates significant vulnerabilities, and an ever-more irresistible opportunity for hardware hackers. In a recent report for the Brookings Institution, John Villasenor, a professor of electrical engineering and public policy at University of California at Los Angeles, wrote "The laws of statistics guarantee that there are people with the skills, access, and motivation to intentionally compromise a chip design." In other words, more frequent and large-scale hardware attacks are just a matter of time. And when they come, whether from a nation state, a crime syndicate, or a rogue employee, they will arrive in one of two forms: overt or covert." . . . "At this point, hardware hacking is still in its infancy, and so too are solutions to it. Chip designers primarily rely on protocols that have not appreciably changed for years. For that reason, Villasenor wrote in 2010, 'Defensive strategies have not yet been fully developed, much less put into practice.'" The invention described herein provides a novel approach to detecting and addressing these threats as well as more standard counterfeiting, misrepresentation or quality control threats.

Conventionally, employed solutions to validate or verify existence of correct, unwanted, incorrect, dangerous, intrusive, defective, malicious, out-of-specification, or within specification changes in firmware or hardware or out-of-specification hardware, or firmware typically utilize methods which require a chip, circuit, IC, component, sub-system or system to be appropriately powered and appropriately interfaced to specified clock and/or I/O inputs within or near specified voltage and frequency ranges and signal characteristics. This typically requires time and specifically configured test circuitry to be designed, tested, and implemented as a platform for the conventional testing means.

Conventional methods or solutions may typically use existing system's own hardware and/or software resources to provide and generate a necessary electrical context for the subsequent generation of signals used to evaluate the electronic entity under test. This approach typically requires initial and ongoing time, cost and physical resources, and a commitment of these resources before the component can be tested. Further, if a device is found to be unacceptable, additional time and effort is typically required to temporarily or permanently move, activate, deactivate, remove or replace the offensive component, board or entire system—depending on device accessibility and economic feasibility.

Further, to the best knowledge of the Applicant, conventional solutions are incapable of testing any arbitrarily chosen pre-existing operating device without typically incorporating an additional interface means such as an added software component or connected hardware component, requiring additional hardware and/or planning expense.

As well as, conventional solutions may not be capable of influencing (without specific forethought related to the specific system to be tested) any arbitrary pre-existing device, sub-system or system in a wide variety of selectable ways, inducing a wide variety of responses, whether in an operational or non-operational state.

Further, conventional solutions may not be capable of influencing pre-existing devices to a wide range of degrees, especially while the devices are under operation ranging from undetectable to the device under test, to inducing specific selected changes in RF emissions and associated operational influences on pre-existing specific hardware components based on design choices and features, subsystems or components contained therein, to complete disablement of the operating device, to permanent disablement of the device.

The existing methods or solutions typically do not address the detection of changes already or previously placed in firmware or hardware circuitry. Further, the existing methods may require an intrusive means, typically including added hardware or software components to the system, effectively modifying its design and/or modifying system's operation to accomplish intended goal(s). The existing methods typically may not be performed in a non-contact, undisturbed, non-powered, unmoved manner and/or an undetectable manner and/or at a distance from a questionable device. More so, to the best understanding of the Applicant, conventional solutions, employed to address the above described issues, are associated with many disadvantages.

For example, the conventional solutions typically may not detect deliberately concealed and temporarily inactive malicious hardware or firmware modifications lurking in an infected system and waiting to be automatically invoked or unleashed when triggered by a condition, a signal combination, a status change or any combinations thereof. The conventional solutions may not be implemented in a separate, portable, unobtrusive, non-contact, and attachment-not-needed devices for inspection of suspected equipment. The conventional solutions may not function without modification of or addition to the aggregate digital signaling to or within, digital processing, or logical operations of the device under test, inspection and/or screening. The conventional solutions typically may not improve accuracy by acquiring a baseline of operations, baseline characteristics, or baseline behavior, without a period of intrusive changes such as data acquisition periods while operating nominally and executing on a known-good system and cannot do this at a distance. The conventional solutions typically may not geolocate or locate an electronic device or area within such device associated with a source of emissions indicating the presence of such undesired modifications or lack of modifications in hardware or firmware. The conventional solutions may not invoke state changes which selectively activate, modify or inhibit such malware activity or malware in firmware activity results from a distance by active Radio Frequency (RF) illumination. The conventional solutions may not determine if active RF illumination has succeeded in a desired malware mitigation state change from an illumination source disposed remotely, at distance, from the device under testing inspection and/or screening.

Conventional test methodologies, to best knowledge of the Applicant, may not be capable of unobtrusively detecting malicious malware in hardware components in unpowered, unconnected devices. Existing methods using unit tests run on individual components or regression tests performed may only be capable of assessing presence or absence of functionality.

Counterfeit and subversively modified electrical and/or electronic components represent a substantial threat to electronic systems. Therefore, there is a need for an advanced apparatus, method and tool with widespread applicability towards electronics employed in security applications and, more particularly, in cyber physical security applications.

SUMMARY OF THE INVENTION

In one aspect, an apparatus or a method uses RF illumination of electrical device(s) to detect detailed configuration, quality, authenticity, status and state of electrical devices.

In another aspect, a detection of modifications or changes in hardware, software, or firmware to electrical device(s) is achieved by using received unintentional electromagnetic energy emitted from such electrical device(s) during non-contact RF illumination.

In another aspect, anticipated, abnormal and/or unexpected changes, patterns or characteristics in the unintentional electromagnetic emissions given off by the typically electrically powered device(s), due to the effect of RF illumination, are recognized, measured and used for a further analysis and/or decision making on the status and/or condition of such electrically powered device(s).

In another aspect, detection of physical, firmware or software based anomalies in an electrical device is performed in a fixture-less manner.

In another aspect, RF illumination is electromagnetically coupled directly to a body of an integrated circuit (IC) or equivalent constructed device(s), through its pins, and further directly into the internal traces on the IC In another aspect, RF illumination is electromagnetically coupled directly to circuit board traces of fully populated printed circuit boards.

Other aspects of the invention will become apparent by consideration of the detailed description and accompanying drawings.

BRIEF DESCRIPTION OF THE DRAWINGS

The accompanying drawings are incorporated in and constitute part of the specification and illustrate various embodiments. In the drawings:

FIGS. 16a-16c illustrate the illumination signal (FIG. 16a) graphed in the frequency domain, the resultant unintentional output signals of varying waveform, frequency and amplitudes also graphed in frequency domain, wherein FIG. 16b shows an exemplary illustrative output from a modified electrical and/or electronic device and FIG. 16c shows an exemplary illustrative output from an unmodified electrical and/or electronic device.

DETAILED DESCRIPTION OF EXEMPLARY EMBODIMENTS

Figure 1:
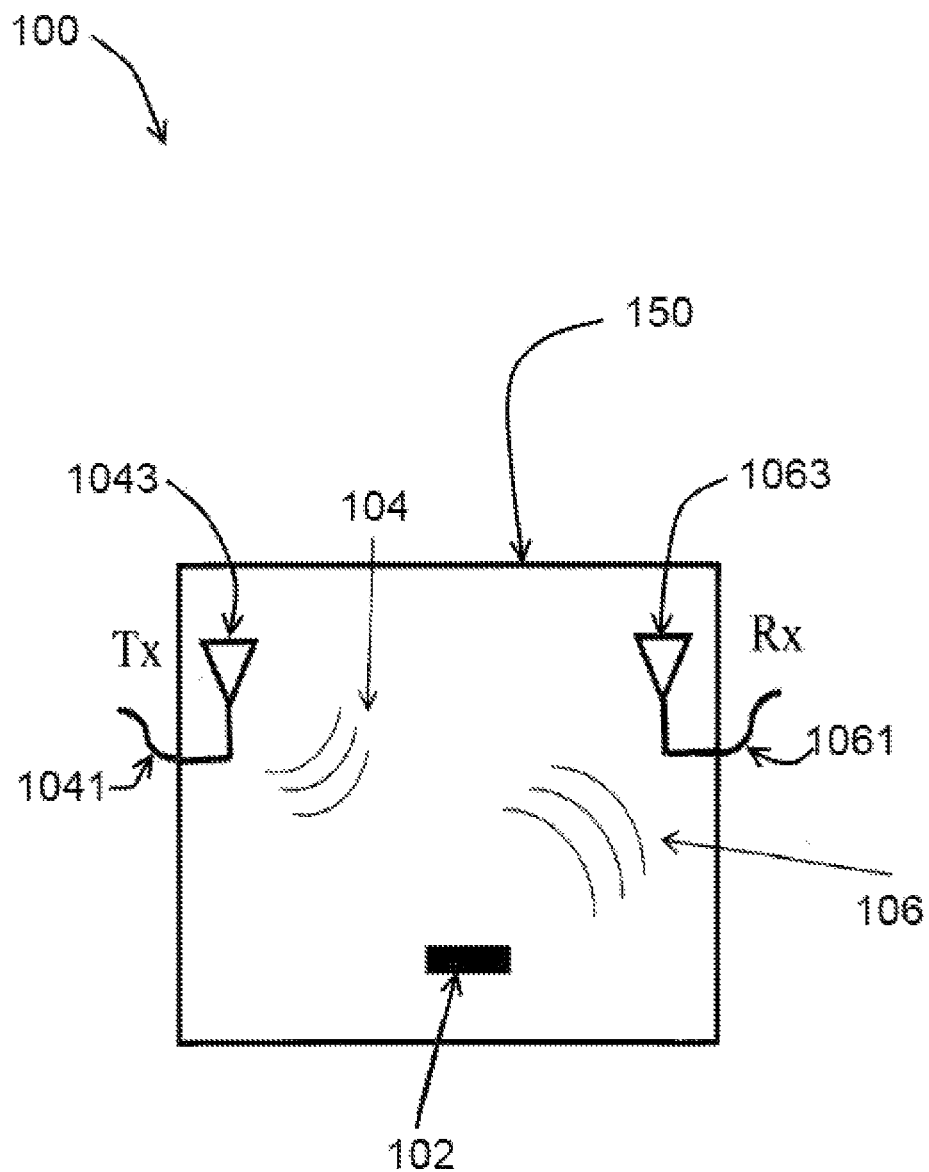
FIG. 1 is a schematic block diagram of an exemplary embodiment of an apparatus for testing, inspecting and/or screening electrical and/or electronic devices using a first antenna to transmit RF excitation energy and a second antenna to receive RF electromagnetic energy pattern artifacts resulting from RF excitation energy.

Prior to proceeding to the more detailed description of the claimed subject matter it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "exterior," "interior," and derivatives thereof shall relate to the invention as oriented in the Figures. Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the invention are provided for illustration purpose only and not for the purpose of limiting the invention as defined by the appended claims and their equivalents.

The term "artifact" used herein refers to its definition as "something observed in a scientific investigation or experiment that is not naturally present but occurs as a tangible and/or measurable result of the preparative or investigative procedure".

In other words, term "artifact" is intended, to mean herein a characteristic that is generated by the device due to application or coupling of RF energy with highly specific frequency(s), amplitude, polarization, location, orientation, waveform and/or other characteristics to the device. Artifacts created may include, without limitation, component(s) such as EM wave, frequency feature, for example such as shift, non-linear response, peak location, relative dB height, spacings between peaks in a single emission, phase noise present, relationships, for example such as spacings between peeks, in multiple unintentional frequency emissions arising and present, EM polarizations, etc. More specifically, the exemplary embodiments focus on frequency feature unintentionally (not intended by the manufacturer) generated and re-emitted due to illumination with RF energy. As an example, the peak location and relative dB height of new peaks appearing as a result of and far from a fundamental single illumination frequency would be derived and by-product of the design and constructions of the device and hence be considered a frequency artifact(s).

Term "signature" is intended to mean herein a constructed combination-construction of two or more components of a single artifact, two or more components of multiple artifacts or a single component of a single artifact.

Term "illumination" is intended to mean herein a transmission of RF energy from an antenna toward the device and the impingement of the RF energy upon the device.

Term "excitation" is intended to mean herein absorption of transmitted RF energy that results in a presence of emitted or re-emitted artifacts or lack of emitted or re-emitted artifacts.

The term "device" is intended to mean herein, without limitation, any electrical and/or electronic device, set of combined connected devices in a circuit arrangement, multi-chip-module, completed semiconductor die, circuit board, sub-system or system.

The term "anomaly" is intended to mean herein, without limitation, an RF unintended emission or RF unintended emission signature element which extends outside the expected range of a characteristic or characteristics of an exemplary good device or a set of devices. This includes a characteristic which is not found to common to all other supposedly same devices or candidate good devices in a set.

The term "Cyber physical security" used herein refers to the integrity of hardware IC chips, boards and components employed in a system, including firmware. The compromise of the hardware or firmware at any stage through clandestine modification at manufacture, implementation or use allows for security Trojans or weaknesses to be introduced, such as a severe reduction in the randomness of a random number generator used in encryption operations. Tainted parts, counterfeit parts, cloned parts, subversive parts, hardware Trojans, etc. would all fall under the category of cyber physical threats. Such threats implemented in devices before, during or after manufacture of a system containing those devices can severely reduce the security, integrity, operation and intended functionality of a system. Thus, cyber physical security can be assured through the implementation of the exemplary embodiments at a variety of time or phase points in the manufacture, installation or implementation stages of a system containing such compromisable or compromised devices.

It is to be understood that the singular forms "a," "an, and "the" include plural referents unless the context clearly dictates otherwise. Thus, for example, reference to "a device" includes reference to one or more of such devices.

It is to be understood that a device or a detectably modifiable electronic part (DMEP) typically under test, inspection and/or screening, by the instant invention may be, but is not limited to an IC chip, FPGA, ASIC, board, partially assembled board, sub-system, complete computer system, computer peripheral or can be considered to be a pattern in computer memory. It is further to be understood that a good DMEP can be a known good part, or can be a DMEP containing known good firmware or hardware. Further, it is to be understood that a candidate DMEP is a DMEP with unknown firmware or hardware. Finally a bad DMEP can be a DMEP with deliberately modified firmware or hardware or is a DMEP with an anomalous and/or a malicious firmware, such as an improper firmware version, improperly written firmware with bit or byte changes errors, firmware running under incorrect or undesired parameters, firmware running in an incorrect or undesired state, firmware with undesired bugs, malware, worms, Trojans, virus, incorrect firmware, exploits, or deliberately or unintentionally modified firmware behaving contrary to its expected or intended function or purpose. The DMEP firmware may include additional functionality, disabled desirable functionality or be lacking desired functionality. Firmware may be considered to be a bit pattern which modifies, establishes, or configures operation of hardware. This definition also includes accidently or deliberately modified hardware. This definition is further directed applies to parts, components, devices, apparatuses, subsystems or systems whose operation has been modified for malicious purpose while hiding its intent to deceive as to the intended modified function.

These firmware execution resultant signature definitions, with particular direction to improper-firmware can be received from all parts to include, but not limited to active and passive circuit board parts, semiconductor devices and integrated circuits. It is to be understood that a modified or unmodified device refers to a device which has or has not been modified from its original intent in bit, byte or word patterns in firmware, or programmable hardware, or by other changes such as FIB ion beam circuit editing. The detection of the unmodified nature of an unmodified device may be recognized as important in the cases where an upgrade is expected to be in place, wherein the upgrade's purpose is typically to eliminate specific firmware or firmware security vulnerabilities, and unmodified firmware, firmware or hardware represents an entity with a known exploitable vulnerability which was believed to have been patched or repaired previously.

Every electronic device gives off electromagnetic emissions when operating. Many exemplary embodiments operate by analyzing the unintentional emissions or unintentional features of intended emissions of a microelectronic device, thus analyzing the phenomenology that is causally dependent on its internal circuitry and programming. All circuitry including Malicious circuitry resulting from hardware or firmware modifications such as hardware Trojans emit well-defined signatures that are detected by identifying characteristic signature elements associated with altered or additional functionality inserted into the IC. This approach can exhibit several potential advantages, namely passive, non-contact scan of the device under test, is completely nondestructive and poses no hazard to operators or environment, allows a rapid test approach enabling screening of 100% of IP cores intended for devices in critical applications, can scan the hardware or instantiated firmware prior to test integration, preventing any possible contamination of the larger system, can continuously monitor and test a system while its usefully and functionally operating, typically without interfering in any way with the normal operation. This enables a test system which can virtually immediately detect a malicious injection attempt before it becomes operational, while it is being altered, is fully operational, or before it can cause loss or damage. Supervisory systems, circuitry and/or firmware, using the instant invention upon detection of a part deemed to contain anomalous content, can be notified of a new, attempted, ongoing or sudden malware presence or partial presence and thus allow action to be taken such as a switchover to an isolated redundant backup system, disconnection from a network providing the injection of malware, placing the system in a non-operational state to prevent damage of other equipment or other loss including data loss, quarantine of the system to prevent spread of the malware, disabling external access to the system to prevent unwanted external access to a compromised system, and/or other appropriate, necessary or desirable actions. A signal, voltage state value, watchdog periodic signal, or the like can be transmitted or connected to external equipment or annunciators to notify external equipment or personnel of the continuous, periodic, sporadic or occasional monitored equipment status. Further, the RF transmission used in the diagnostic process can be transmitted at higher power levels and/or other frequencies to disrupt, disable or permanently damage a device deemed infected with undesired firmware, also there is a capability of determining if the infected device has been appropriately disrupted, disabled or damaged as a result of manual or automatic disruption efforts. It should be noted that although the emission acquisition means is typically an antenna and specifically typically a wideband antenna, emission features or emissions especially in the RF range coupled into the devices' normal signal line circuitry may be similarly emitted and/or acquired in some exemplary embodiments thru appropriate capacitive, inductive or direct yet non-contact coupling means (such as inductive loops or capacitive plates in the vicinity of the device) to I/O lines without interfering in any way with normal operation. Further, although the intended signal characteristics analog interpretation may at worst be only slightly modified, the intended digital data and its binary representation and interpretation typically remains unchanged. The possibly slightly modified specified voltage and data eye diagram characteristics ranges remaining still well within acceptable analog tolerances for proper digital interpretation and operation by hardware circuitry. Such analog emission features embedded and carrying the digital data are unintentional by the designers or manufacturers, but may subtly ride or be associated with the intended data features or emissions. These features would typically not be sensed or in any way effect the normal operation of the device. Typically these features arise unexpectedly and are within design tolerances of the devices, and such features also typically interact with other features of the system, and other devices, subsystems, board traces or physical layout in unexpected fashions. While the system operates nominally correct from the designer's point of view, a vast array of very small and complex interactions, seen at a higher voltage and/or time signal resolution in the time domain, but especially in the frequency domain, arise which the exemplary embodiment(s) exploit to semi-uniquely identify correct configuration and operation of the device. A simple example would be the time domain and/or frequency domain characteristics of digital signal rise times, fall times, 0 states or 1 state. Such undesigned, unintentional, unexpected and unanticipated subtle minor analog characteristics can widely vary due to minor configuration differences (part placement location change, added gates allocation in an FPGA, part tolerances, and functionally equivalent yet different parts) while still conveying and processing the correct digitally encoded data. In this way illumination of an operational device while performing normal processing may result in re-emitted RF features characteristic of the internal architecture of the device without disrupting operation of the device.

The forgoing description will be focused on emission of unintentional free field electromagnetic energy and, more particularly, the emission of unintentional electromagnetic energy being in a Radio Frequency (RF) band or spectrum defined by the Webster's dictionary as any of the electromagnetic wave frequencies that lie in the range extending from below 3 Kilohertz (KHz) to about 300 Gigahertz (GHz) to non-destructively scan the part in either or both powered-on and powered-off conditions to determine authenticity. An exemplary compact embodiment operates between 1 MHz and 3 GHz. Although higher RF frequencies, THz frequencies, infrared, infrasonic and other emissions are also contemplated by some exemplary embodiments.

Some exemplary embodiments are illustrated and described in a combination with an integrated circuit (IC), electrical component, or a semiconductor as the device under test, although it will be apparent to those skilled in the relevant art that the instant invention may be applied to other electrical or electronic devices such as boards, multi-chip modules, systems, sub-systems, peripherals and the like and as such should not be interpreted as a limiting factor of the instant invention.

Electronic components exhibit characteristic electromagnetic responses when powered. Accordingly, some exemplary embodiments provide a novel tool which illuminates the electronic device while the tool simultaneously or in sequence electromagnetically scans the electronic device in the RF and microwave regions without need for a test fixture to test the electronic device in either or both a powered-on and powered-off state. It is stated that the embodiments of scanning without illumination, during illumination, just after illumination and a combination of with and without illumination are clearly contemplated herewithin.

Some of the various exemplary embodiments provide a tool that is configured and operable to detect multiple categories of anomalous components or counterfeit electronics, including aged, cloned, and subversively modified, malicious circuitry, malicious code, tampered with or modified devices. The tool can be further configured and operable to handle a wide range of electrical devices, from small Surface-Mount Technology (SMT) to modern System-On-a-Chip (SOC) architectures. The tool is additionally configured and operable to assess the authenticity and proper functionality of electronic devices typically in real time with a high probability of counterfeit detection (Pd) and low False Alarm Rate (FAR).

Using the emissions from the electrical devices, some exemplary embodiments examine, determine and discriminate between physical changes in IC chips, circuits containing active components and circuits containing passive components.

Some exemplary embodiments utilize RF illumination that acts to electromagnetically and directly impinge (or couple to) the body of the component, through the pins of the device, directly into the internal traces on an IC or equivalent constructed devices or to circuit board traces in the case of fully populated boards. The energy that is coupled into device becomes electrical energy usually though not necessarily at the frequency or wavelength of the energy that has been coupled into the device. The electrical energy that has been coupled in then propagates through the device electrically and is re-emitted electromagnetically. The manner in which it propagates and is re-emitted is specific to the internal physical make-up of the device from a materials, electrical and configuration standpoint. This detail is therefore captured in the re-emitted electromagnetic energy. The re-emitted electromagnetic energy is then received and processed by the exemplary embodiments.

Some conditions sensed by exemplary embodiments include a condition wherein energy collected by a device or a circuit of devices and re-emitted or re-radiated may be re-emitted or re-radiated at the same frequency, slightly offset frequencies or substantially different frequencies (especially true where non-linear effects come into play). The re-emitted frequencies can correspond to internal circuit effects seen include responding at other frequencies, some frequencies being closely related while other frequencies are distantly related. These reemissions effects, as noted, can be caused by both the linear and non-linear mechanisms. As one example, the linear antenna resistance causes a change in antenna Q-factor which can measurably broaden the re-emitted frequency and measurably increase phase noise which can be analyzed by the instant invention. The RF illumination of the device 102, which may be a single component, IC, sub-system or complete system, is sometimes described by those skilled in the art as the equivalent of capacitive and inductive features or loading of the circuits effectively equivalent to capacitive or inductive reactance. This offers a broader controllable diagnostic capability, and is especially effective when analyzing power being applied is unimportant to the diagnostic process.

Some exemplary embodiments provide an electromagnetic waveform that is intended to illuminate the device. That apparatus is typically connected to an antenna that launches the electromagnetic wave at the device. The device electronics absorbs the incident electromagnetic wave and re-emits electromagnetic energy that contains characteristic time, frequency, phase, amplitude or dB orthogonal dimensional information which can be converted or extracted into one or more signatures or fingerprints indicative of the parts inner workings and/or unique characteristics from which can be discerned the inner make-up of the part and/or even the associated details such as manufacturer or manufactured batch of the part. The re-emitted electromagnetic energy can be collected by a second antenna for the described analysis. This second antenna is connected to a receiver that receives the energy and a processor that processes the re-emitted energy typically in the manner described herein and provides analysis of that energy to typically determine if the part is authentic or not. Such processing typically can include automatic gain control (AGC), active filtering of unwanted RF features by hardware or software bandpass or band reject filters, FFT conversion, Wavelet transform denoising, signature creation, signature comparison, signature feature extraction or discrimination, and the like. The tool can typically function when the part is powered or in a non-powered state, operating or non-operating, however the non-powered, non-operational state is typically utilized. When the part is in a powered state the powered non-illuminated signature and the powered while illuminated signature are both independently analyzed and the signatures of both states of illumination compared by the invention.

In some exemplary embodiments, specific elements and methods used in this invention, may result in direct illumination and energization of all conductors and conductive traces within the device under test inspection and/or screening while it is under test and is unique to all other test methods which (with intent) connect to specific I/O or IC pins with specific and potentially separate signals. The method influences and energizes and creates a characteristic response from all, each and every conductive element in the device, including those potentially isolated from other parts of the chip. Each element in its influencing context of surrounding and influencing dielectric, conductive, or semiconductive elements is exercised and emits a resulting signal not only related to its conductor characteristics such as length, trace width and orientation, but also based on the adjacent elements characteristics noted above and the surrounding similarly influenced and radiating elements. All such elements may interact with all other elements, including resulting emissions influencing other elements in the part, and the degree of complexity becomes virtually infinite, the limitations of discerning this feedback and resulting virtually infinite details contained therein is only limited by the sensitivity, sophistication, computational capability, software capability, and noise level of the equipment utilized within the construction of the invention to perform its function.

In some exemplary embodiments, there are no electrical attachments to the pins of the device 102 under test, (that is a completely electrically isolated device). No connections of any kind are necessary, although assessment of the device with one, two or more connections is contemplated here within. Without any connections a complete isolation of the device from ground is achieved, eliminating any undesired loss or dampening of signals due to low impedance coupling of high-frequency signals to a ground path through, for example, any connection including a power input, clock input, output pin or ground with inevitable finite impedance to ground (typically through filtering/bypass capacitors) resulting in a changed or reduced signal versus frequency profile. The highly complex impedance versus frequency response characteristics resulting from such a ground path can thus be circumvented, along with the need for an electrically connected test fixture and the specific design and frequency response variations caused by both the electrical design of the test fixture and possible variations (such as tolerance variations) between multiple manufactured fixtures including tolerances of any passive and/or active components electrically integrated into the circuit of the test fixture, said variations causing variations in frequency response profile which could reduce response detectability/sensitivity/specificity/uniqueness of part 102 response characteristics or cause unwanted additional signature variation that may result in greater overlap between a modified and an authentic part, increasing potential false positive rates. Further, additional frequencies may be more observably strong enough (not be attenuated due to loss thru a lower impedance path to ground) in a short time period to be used to further discriminate between parts, providing faster, more certain, more accurate and/or more specificity in analysis results.

Now in reference to FIG. 1, one exemplary embodiment provides an apparatus 100 for testing, inspecting and/or screening a device 102 which is illuminated by an RF transmission 104 from a transmit antenna 1043 powered through a cable 1041. The device 102 re-emits RF radiation 106 which is received by a receive antenna 1063 and the resulting electromagnetic energy is fed through a received energy coaxial cable 1061 for further processing in steps 308, 310, 312, and 314 of FIG. 3B. The device 102 may be enclosed in an enclosure 150 defined by a set of walls forming a hollow interior. Essentially, the enclosure 150 defines a chamber. The chamber or enclosure 150 may be manufactured from a conductive material to shield the antennas 1043, 1063 from unwanted external RF noise interference, and/or prevent electromagnetic interference (EMI) during operation. Further, it may prevent an intense illumination signal, artifact signals, or any signals therein from escaping the chamber to influence unrelated devices or equipment in an undesirable manner. In one example, the chamber or enclosure 150 may be an anechoic chamber. In another example, the chamber or enclosure 150 may be a reverberation chamber. In another example, the chamber or enclosure 150 may be a shielded chamber. In another example, the chamber or enclosure 150 may be an electromagnetic cell (TEM cell). In another example, the chamber or enclosure 150 may be a Gigahertz electromagnetic cell (GTEM cell). The apparatus 100 also contains hardware circuits and/or components, whose description is omitted herein for the sake of brevity, for developing and/or generating waveforms and processing received artifacts.

One or both antennas 1043, 1063 may be of horn antenna(s), log-periodic antenna(s), Yagi antenna(s), other antenna types, or the illumination and receipt of re-emitted energy may be achieved by a use of Anechoic chamber penetrations, GTEMs and the like.

Figure 2:
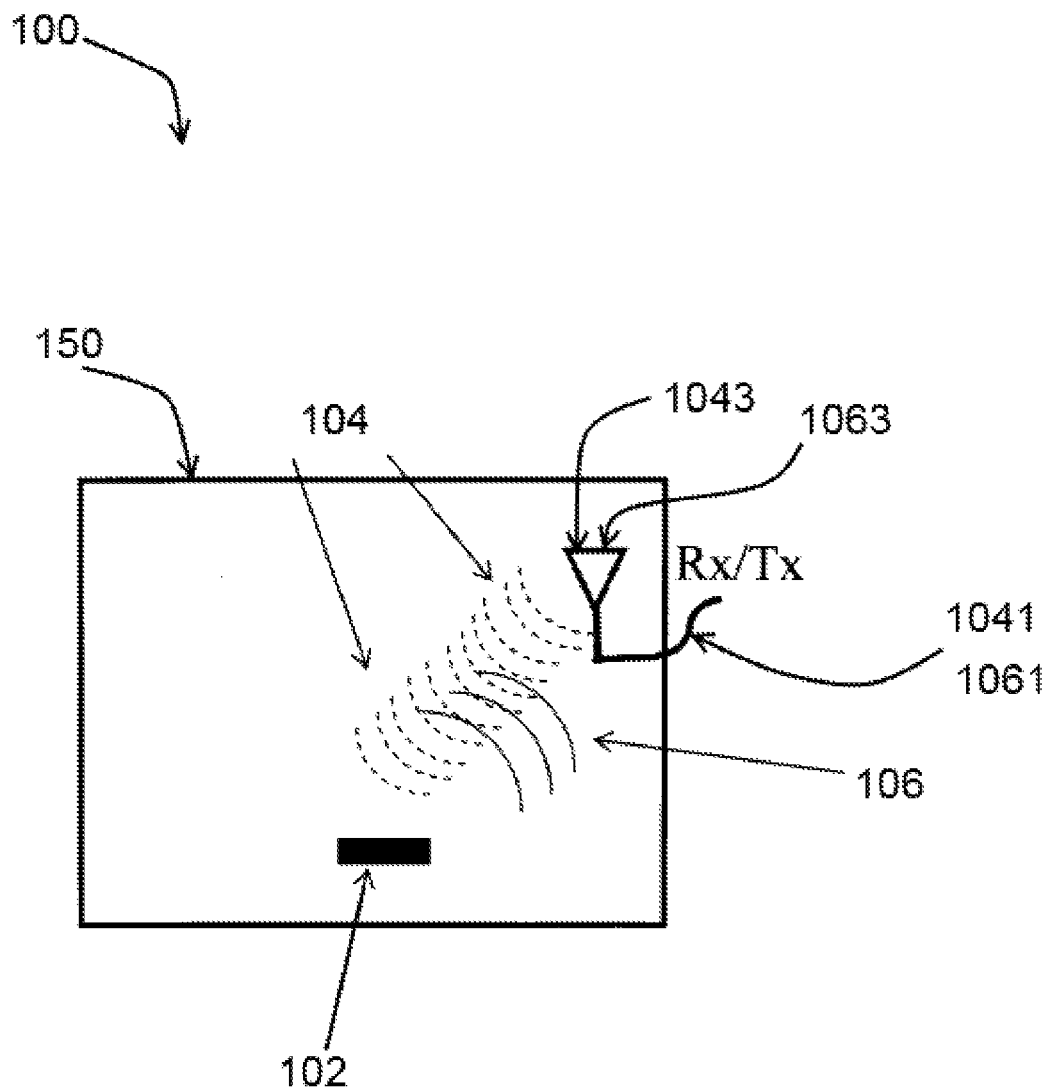
FIG. 2 is a schematic block diagram of an exemplary embodiment of an apparatus for inspecting or screening electronic devices using received RF emission features resulting or derived as artifacts of RF transmitted excitation energy using the same antenna to both transmit RF excitation energy and receive derived RF electromagnetic energy pattern artifacts.

FIG. 2 illustrates another exemplary embodiment, wherein the transmit antenna 1043 and the receive antenna 1063 are combined and provided in a single antenna configuration, and further using the same coaxial cable 1041/1061. The general operation of the apparatus 100 in FIG. 2 is similar to the operation of the device shown in FIG. 1. To avoid interference or confusion between the transmit and receive electromagnetic energy within the hollow interior 151, the transmit frequencies transmitted by the single Tx/Rx antenna 1043/1063 may be different from the receive frequencies received by the single Tx/Rx antenna 1043/1063. Alternatively, the transmit electromagnetic energy 104 may be transmitted and stopped before the receive electromagnetic energy 106 is received.

Figure 3A:
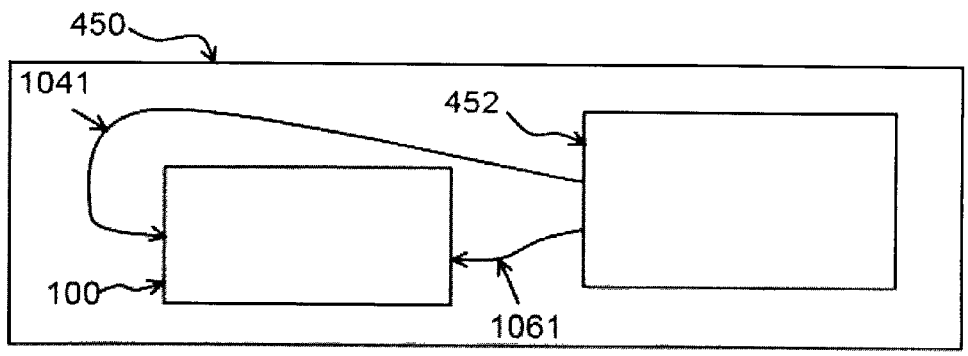
FIG. 3A illustrates another exemplary embodiment of an apparatus for testing, inspecting and/or screening electrical and/or electronic device(s)

FIG. 3A illustrates another exemplary embodiment wherein the apparatus 450 includes the above described apparatus 100 coupled to a RF illumination control and capture apparatus, or controller, 452 that, in addition to hardware modules, includes one or more processors and non-transitory tangible computer readable medium and/or tangible computational medium comprising algorithms and/or executable instructions, that cause the one or more processors to at least generate required illumination signal and process signature of re-emitted emission from the device 102. The executable instructions are stored in a non-transitory storage medium within the controller 452 and may be written using any computer language or format. The controller 452 may be provided as a desk top computer, a tower, a custom-engineered and manufactured hardware device, and as a portable device that includes, but is not limited to, a cell phone, a smart phone, a portable personal computer, a pad, or the like.

Tangible computer readable medium and/or tangible computational medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

Alternatively, it may be a plugin or part of a software code that can be included in, or downloaded and installed into a computer application. As a plugin, it may be embeddable in any kind of computer document, such as a webpage, word document, pdf file, mp3 file, etc.

The illumination signal characteristics constructed or chosen may typically be at least one of frequency, amplitude, duration, pulse duration, pulse repetition rate, modulation envelope, arbitrary waveform generator, and the like. The cables 1041, 1061 may be operatively connected or coupled to the controller 452. The controller 452 may include a graphical user interface (GUI). It is also contemplated herewithin that controller 452 may be integrated into the apparatus 100. It is also contemplated herewithin that one or more antenna 1043, 1063 may be provided external to the apparatus 100 or 450.

Figure 3B:
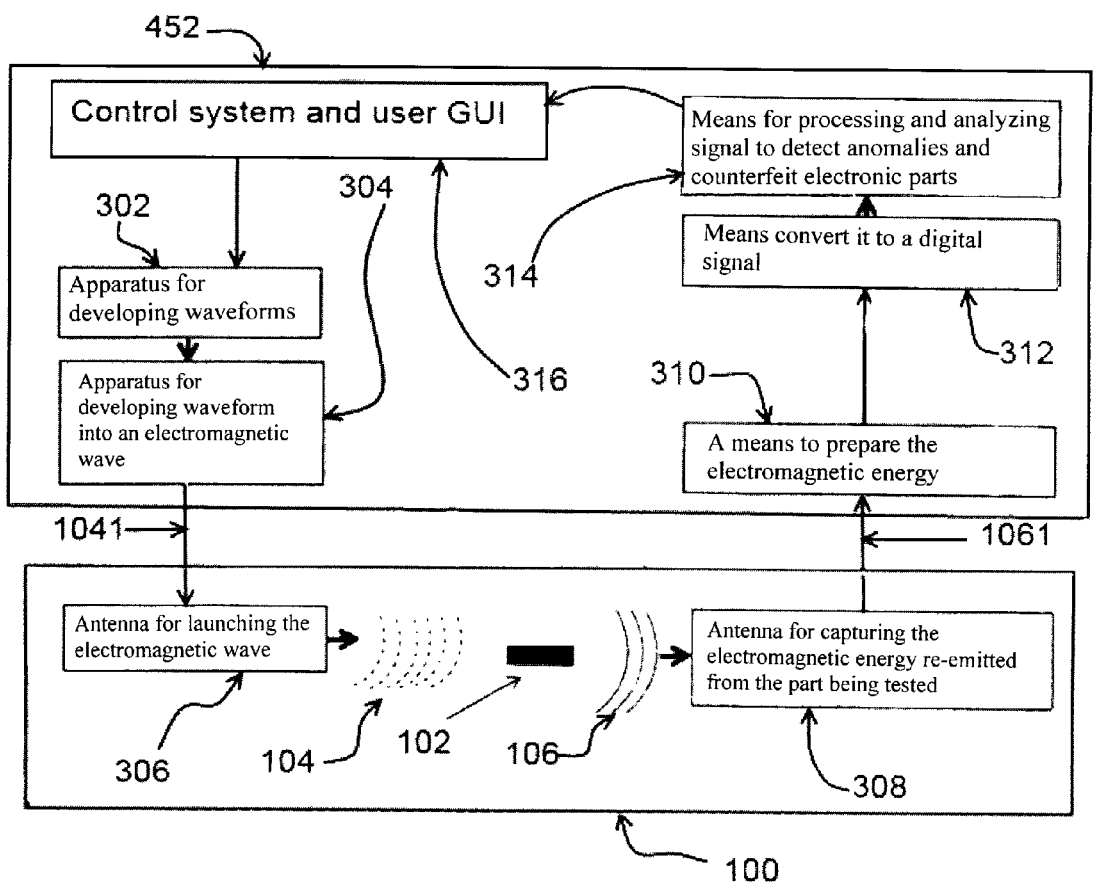
FIG. 3B shows an operational sequence and diagrammatic elements of an exemplary embodiment of an apparatus and/or method for generating RF transmitted energy for excitation purposes through the illuminated and influenced electrical and/or electronic device(s), through the capture of the emitted RF energy artifact(s) to the analysis of resulting derived RF signatures.

FIG. 3B, illustrates an operational sequence/duagramtic elements of an exemplary embodiment of an apparatus and/or method for generating RF transmitted energy for excitation purposes through the illuminated and influenced electrical and/or electronic device(s), through the capture of the emitted RF energy artifact(s) to the analysis of resulting derived RF signatures In step 302, the apparatus 100 is operable to select, choose or prepare a waveform within the of one or more specific frequencies, up to and including using an RF arbitrary waveform generator, at specific amplitudes or amplitude envelopes such as modulation envelopes, based on the expected type of the device 102.

In one example, the waveform may be selected, chosen or prepared to develop differentiating electromagnetic signature re-emissions that provide additional differentiation between authentic and anomalous parts that are not evident in passive emissions. In another example, the waveform may be selected, chosen or prepared to develop differentiating electromagnetic signature re-emissions that provide additional differentiation between authentic and anomalous parts by enhancing signature content that is evident in passive emissions. In a further example, the waveform may be selected, chosen or prepared to develop differentiating electromagnetic signature re-emissions that provide additional differentiation between authentic and anomalous devices by using enhanced passive signature content and emissions signature content that is only generated during illumination of the device 102.

In step 304, the controller 452 generates or develops the desired waveform.

The more uniquely identified artifacts such as these patterns of peaks and their locations which are expected from good parts, the higher statistical certainty of correctly discriminating between good and bad parts, and the lower the rate of 'False positives' and 'false negatives'—that is parts incorrectly identified as to their authenticity characteristics. The generated or developed waveform may include multiple frequencies that are at least one of simultaneously and concurrently contained in the developed waveform which is subsequently converted into an electromagnetic wave and transmitted by the antenna for launching the electromagnetic wave.

The generated or developed waveform may be selected based on the known type of the device 102 matching a number of known possible developed waveforms each associated with a possible device by means such as a maintained database of devices containing associated characteristics, illumination frequencies, receive frequencies, signatures and the like.

In step 306, the generated waveform is fed in analog form through a connection means such as a BNC connector and/or coaxial cable 1041 to a transmit antenna 1043 that emits such generated waveform through space as the transmit electromagnetic energy 104. As is further seen in FIG. 3b, the transmit electromagnetic energy 104 is directed towards or in a direction of the device 102 which re-emits a resulting RF electromagnetic energy 106, received in step 308 by the receive antenna 1063. This energy 106 is typically fed through the coaxial cable 1061 to a receive means, such as a receiver 310, that may be of a superheterodyne type. The receiver 310 is described in details within the above described documents incorporated by reference herewithin and its detail description is omitted herewithin for the sake of brevity. The receiver 310, controlled by the controller 452, may perform a variety of electrical electromagnetic energy enhancement operations on the resulting received RF electromagnetic energy 106, including impedance matching, amplification using an LNA, RF band prefiltering using one or more bandpass filters or band reject filters, or the like. In step 312, the enhanced electrical electromagnetic energy representation is converted into a digital representation, and in step 314, the digital representation of the received analog RF electromagnetic energy is processed and analyzed for the artifact(s) expected to be present (ex. frequency peaks at specific frequency locations containing key relative and relevant frequency spacing and dB height features to be extracted for later signature generation and later exemplary signature comparison), indicative of the state and/or condition of the device 102 being at least one of modified, unmodified, tampered, malware, or counterfeit nature, and/or probability thereof. In step 316, the results are processed and/or displayed for user information, statistics gathering, signature creation, analysis, and/or further action and/or used as a basis for further operations such as one or more of disposal, cataloging, certification, and/or final enablement of the device 2. Step 316 may be executed to provide initialization of the apparatus 450, modification of its operational parameters such as manual selection of frequency settings, selection of exemplary signature files whose parameters are to be used to provide illumination and settings for received frequency capture and the like in an automated, semi-automated and/or manual manner.

Software algorithms or code executed in analysis of the emission artifacts and construction of the signatures include algorithms for locating peaks above a significant height threshold. This enables the extraction of important peak features only and also the rejection of peaks which may likely be noise. Such noise may reduce the discrimination effectiveness between an authentic and bad part by potentially confusing a comparison algorithm. Other software algorithms or code may compare patterns of peaks within a narrow frequency span, to known patterns from known good parts. Additional software algorithms or code are described in the above described documents incorporated by reference herewithin and their detail description is omitted herewithin for the sake of brevity.

Another exemplary embodiment may provide a non-transitory tangible computer readable media and/or computational media containing a series or a set of instructions that when executed by one or more processors causes a method of preventing and/or determining cyber physical security threats by at least executing a step of determining anomalies in device(s) 102.

Another exemplary embodiment may provide a non-transitory tangible computer readable media and/or computational media having instructions encoded thereon for enabling one or more processors in a controller or a computer to prevent and/or determine cyber physical security threats related to undesirable anomalies in electrical and/or electronic devices.

Figure 4:
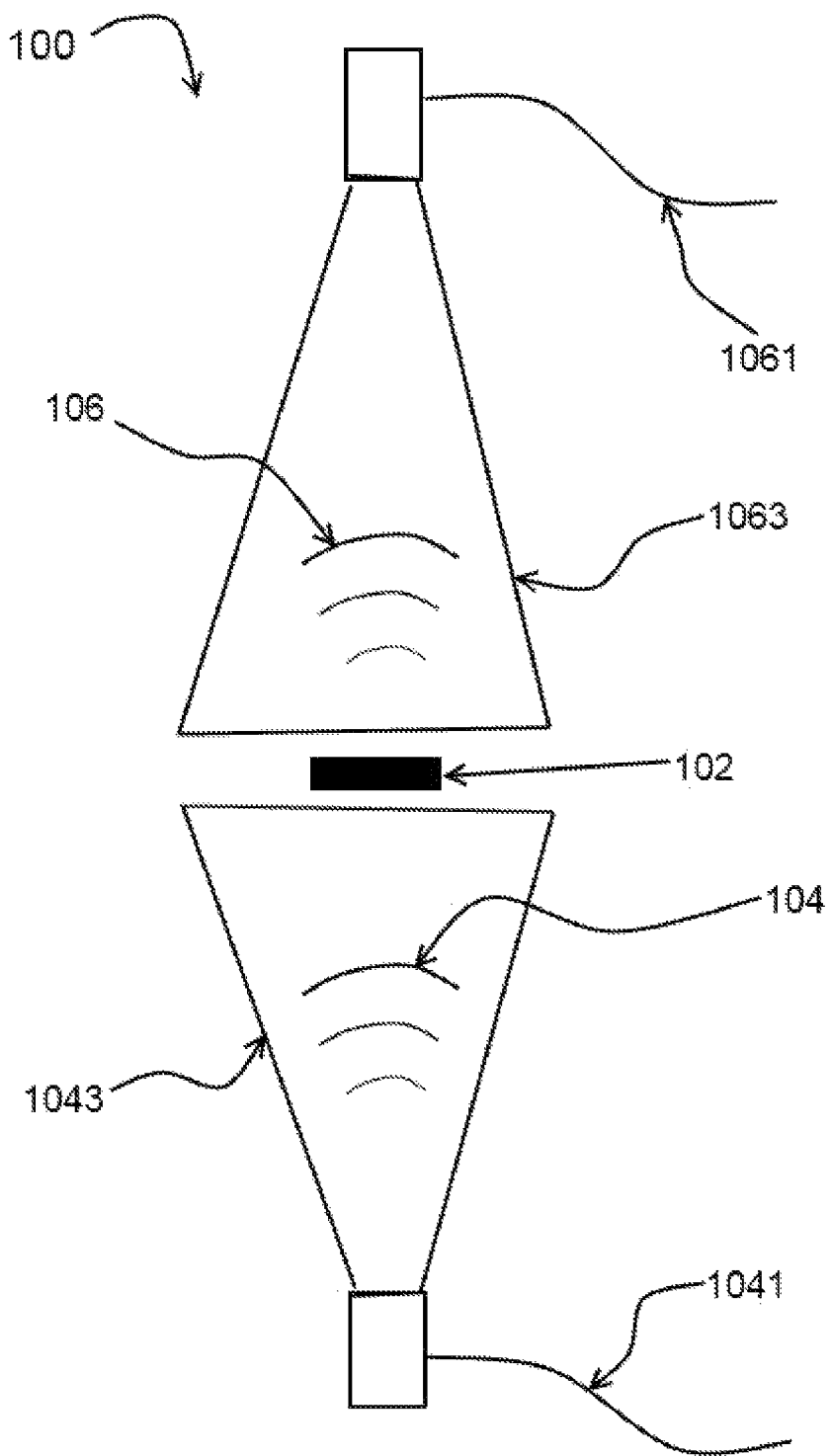
FIG. 4 shows an exemplary embodiment of the invention comprising two separate tapered shaped horn antennas, one operable and configured as a transmit antenna and the other one operable and configured as a receive antenna.

FIG. 4 illustrates another exemplary embodiment, wherein antennas 1043 and 1063 are provided as horn shaped antennas disposed in series and opposite one another and wherein horn antenna 1043 generates an RF illumination electromagnetic energy 104 absorbed by the device 102 which then re-emits RF electromagnetic energy 106 containing many new detailed RF frequency artifacts such as unintended frequency peaks described herein and derived from the device 102. The electromagnetic energy 106 is received by horn antenna 1063 for further processing and analysis by the invention, including RF signature derivation and analysis with comparison against known exemplary signatures.

Figure 5:
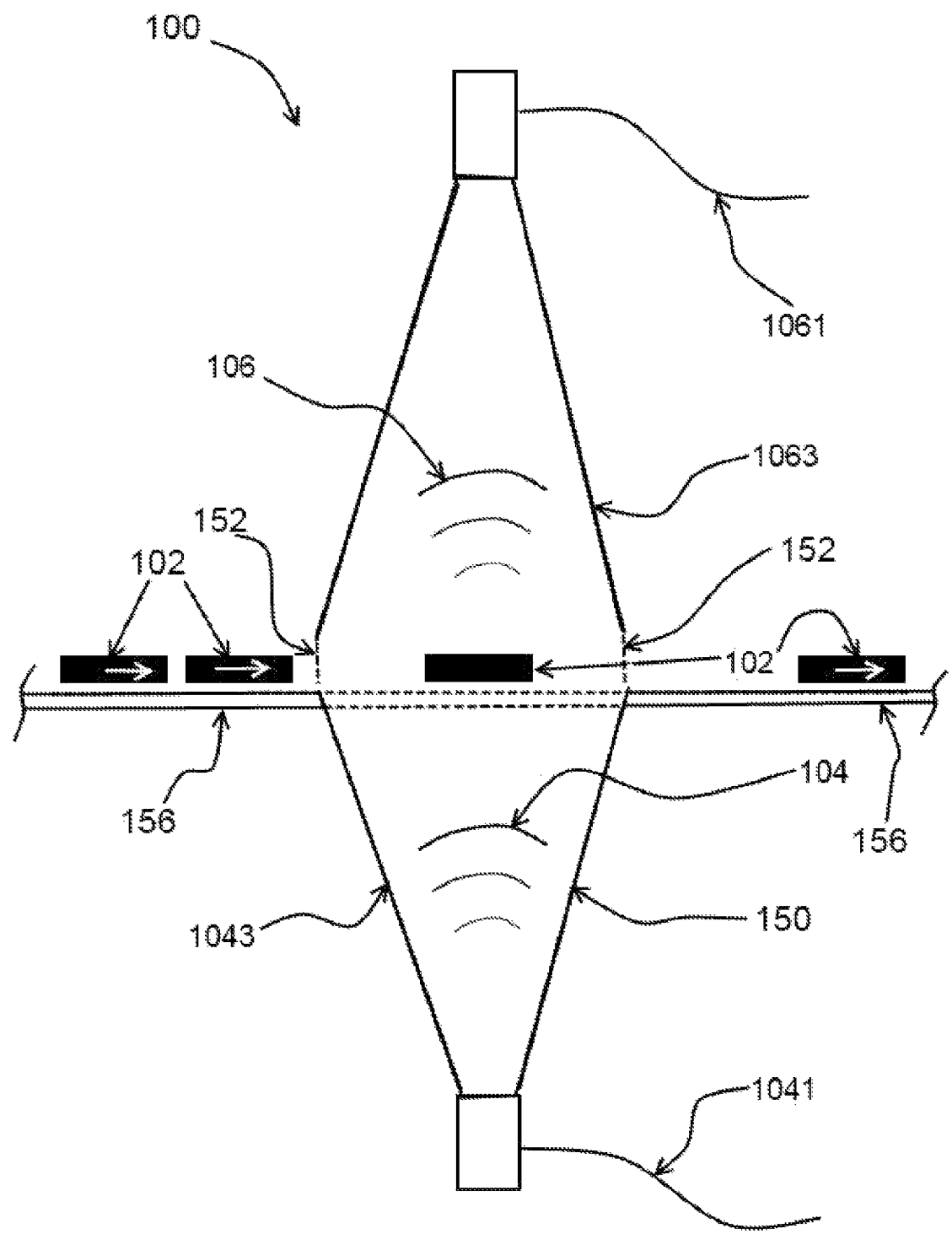
FIG. 5 shows an exemplary embodiment of two separate horn antennas adjoined or combined to form an integral part of an RF shielding chamber, with a conveyor belt feeding electrical and/or electronic device(s) for testing, inspection and/or screening.

FIG. 5 illustrates two horn antennas, (or TEM cells or GTEM cells) 1043 and 1063, wherein horn antenna 1043 generates an RF illumination electromagnetic energy 104 absorbed by the device 102 which then reemits RF electromagnetic energy 106 containing many new detailed RF frequency artifacts derived from the device 102. The electromagnetic energy 106 is received by horn antenna 1063 for further processing and analysis by the controller 452, including RF signature derivation and analysis with comparison against known exemplary signatures. The antennas 1043 and 1063 are joined at the open end to form an RF shielding chamber or area 152, reducing the receiving of external RF noise components arising external to the device 102 by the receive antenna 1063 and thus increasing the sensitivity of the device 102 to receiving additional lower level yet more numerous derived electromagnetic energy artifacts indicative of the makeup, design, authenticity, malware containing status, desirable alteration, undesirable alteration, and/or composition of the device 102. Area 152 may be comprised of RF shield doors to open and allow entry and exit of device 102 to be tested. Alternatively, area 152 may indicate a region where the antenna horns are separated by pulling them apart for access and removal, placement or replacement of the device 102, then subsequently being pushed together to again form a unitary chamber blocking admission of unwanted external RF noise from the outside. A conveyor belt 156 may be used to feed and remove device(s) 102 from the analysis region that typically can be substantially formed in the center of the horn ends.

Figure 6:
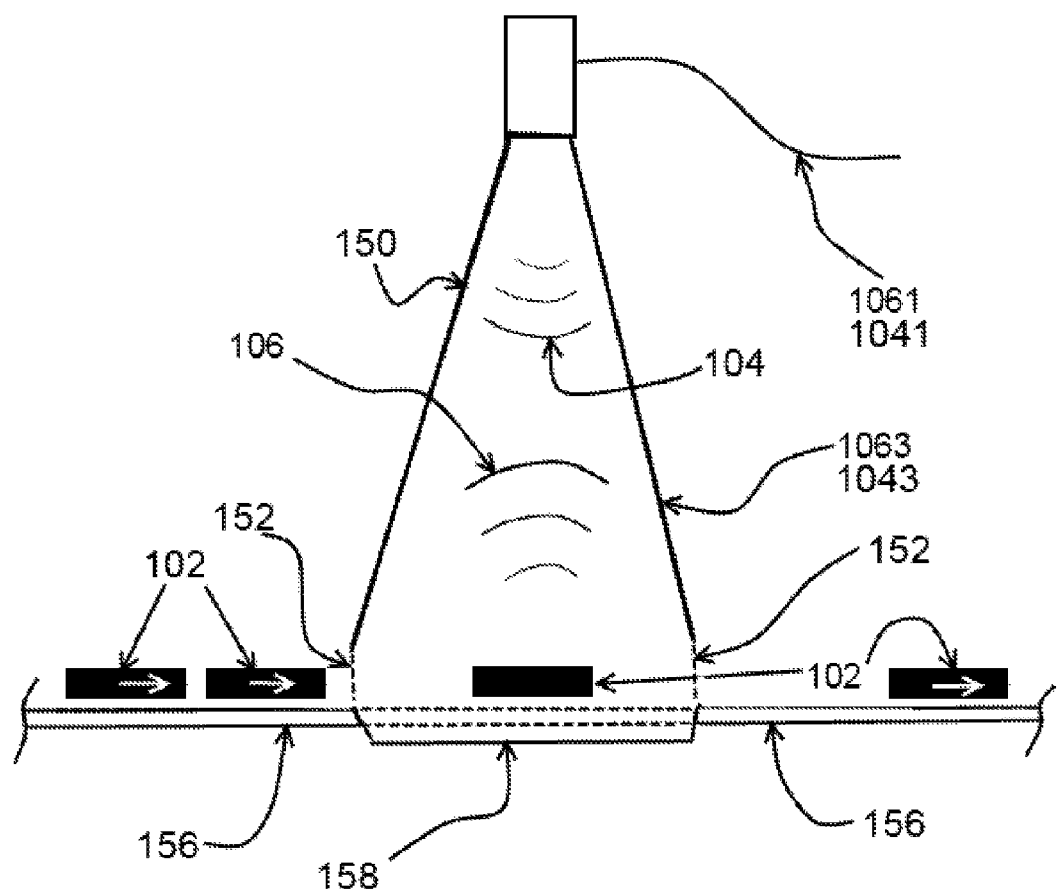
FIG. 6 shows an exemplary embodiment of a single horn antenna, or an Integrated Antenna Enclosure (IAE) that is used to form an integral part of an RF shielding chamber, with a conveyor belt feeding electronic devices for test, inspection and/or screening.

FIG. 6 illustrates a single horn antenna and/or TEM cells or GTEM cells 1043/1063, wherein horn antenna 1043/1063 generates an RF illumination electromagnetic energy 104 absorbed by the device 102 which then re-emits RF electromagnetic energy 106 containing many new detailed RF frequency artifacts derived from the device 102. The electromagnetic energy 106 is received by the single horn antenna 1043/1063 for further processing and analysis by the invention, including RF signature derivation and analysis with comparison against known exemplary signatures. The antenna 1043/1063 is terminated at the open end to form an RF shielding chamber or area 152, reducing the receiving of external RF noise components arising external to the device by the antenna 1043/1063 and thus increasing the sensitivity of the device to receiving additional lower level yet more numerous derived electromagnetic energy artifacts indicative of the makeup, design, authenticity, malware containing status, desirable alteration, undesirable alteration, and/or composition of the device 102. Area 152 may be comprised of RF shield doors to open and allow entry and exit of the device 102 to be tested. Alternatively, area 152 may indicate a region wherein the antenna is separated from the preferably metallic conductive base 158 by pulling it apart from the base for access and removal, placement or replacement of device 102, then subsequently by being pushed down to the base 158 to again form a unitary chamber blocking admission of unwanted external RF noise from the outside. The conveyor belt 156 may be used to feed and remove device(s) 102 from the analysis region that may be substantially formed in the center of the horn end.

Figure 7:
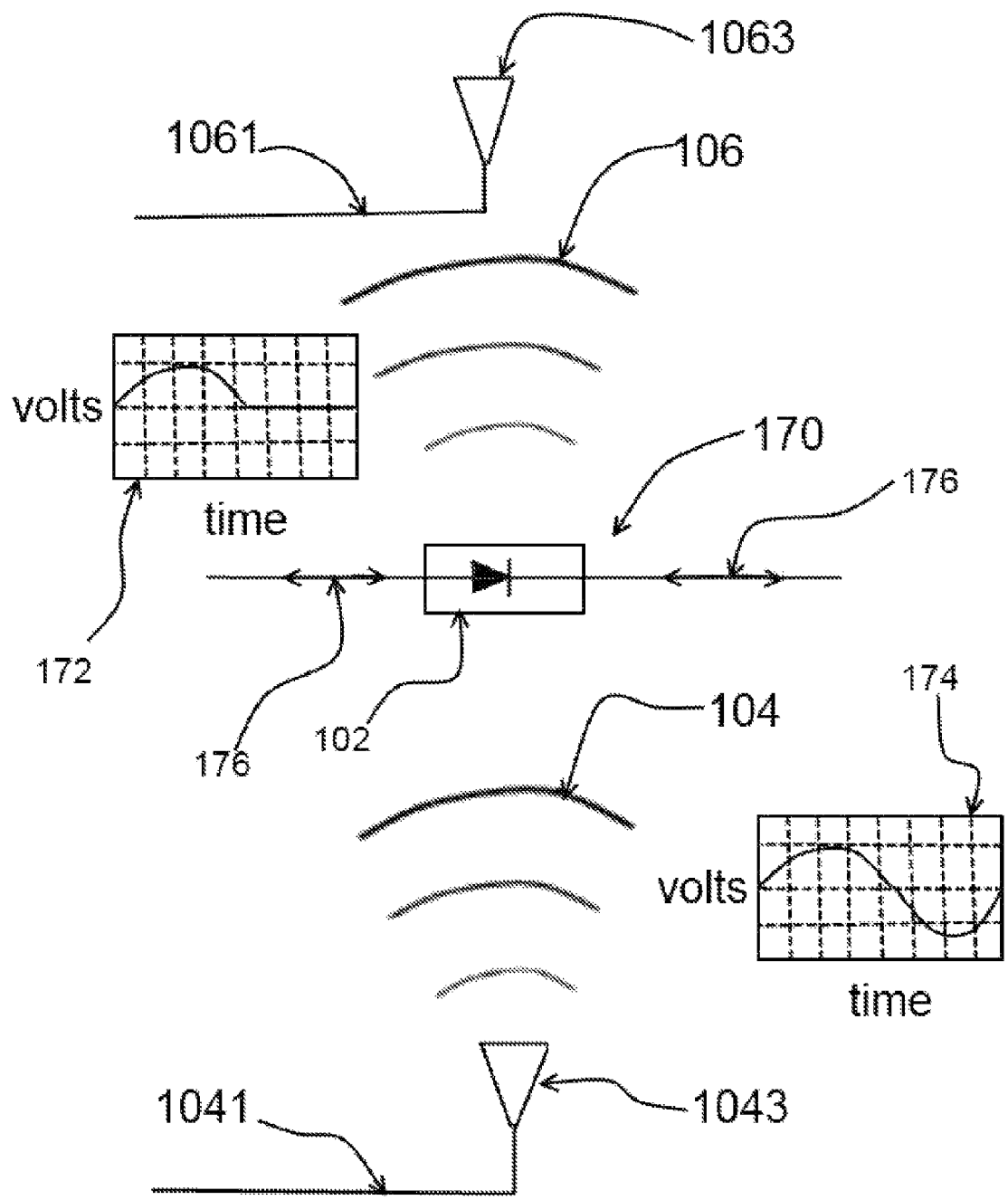
FIG. 7 shows an example of a diode testing, inspection and/or screening that is being illuminated by a single RF frequency and that re-emits an RF waveform containing multiple frequencies.

FIG. 7 illustrates an exemplary application of a dual antenna configuration for testing, inspection and/or screening of the device 102 being a diode 170 subjected to the apparatus and/or method of FIG. 3B and that is being illuminated by a single RF frequency and that re-emits an RF waveform containing multiple frequencies, thus generating a wide variety of characteristic discernable RF frequency patterns characteristic to the Diode's combined internal semiconductor element and attached leads composition, shape, dimensions and length For illustrative purposes, the diode 170 may receive RF illumination electromagnetic energy 104 thorough its connection leads 176 which act as receive antennas receiving typically a sine wave induced current 174 of a single frequency and due to the highly nonlinear substantially unidirectional conductive nature of the diode 170, creating a highly non-sinusoidal current 172 in its circuit. Connection leads 176 also act as transmit antennas which transmit a much more complex multi-frequency electromagnetic energy 106 indicative of the diodes characteristics, orientation in space and connection lead length. It must be noted that a similar process occurs at several orders of magnitudes more complexity and detail in complex ICs due to the existence of hundreds, thousands, millions or even billions of such diode junctions effectively contained in gates within a single IC or a circuit board. This process thus creates the RF electromagnetic energy artifacts arising as indicative of the structure; interconnect lead lengths, lead orientations, firmware programming and hardware programming, and device design of IC chips under test as device 102. Further, highly complex interactions between the leads and interconnects as they emit and absorb each other's resulting RF emissions creates numerous secondary, tertiary, and etc. complex RF artifacts which can be and often are used by the instant invention to discern the makeup, nature and/or authenticity of the device 102.

Such electronic devices 102 may be tested, inspected and/or screened in a non-contact manner, wherein the electronic devices may range from very simple to very complex, from simple passive components such as resistors, capacitors and switches to more complex analog regulators or signal conditioners to highly complex FPGAs, microprocessors, microcontrollers, memory, System-on-a-chip SoCs, multi-chip-modules and sub-systems, boards, or complete subsystems. Effective testing may be undertaken on complex Integrated Circuits (ICs) that typically require substantial time and effort to assess using other approaches. Further, the apparatus 100 or 450 may be capable of testing devices of large form-factor such as axial lead resistors, to small form factors such as surface mount components, including 0402, 0201 or smaller sized components or components that utilize ball grid arrays or even three dimensional circuits. It would be appreciated by those skilled in the art that small passive components may typically require a higher illumination frequency, and the millimeter-wave frequencies, sub-millimeter-wave frequencies and THz frequencies are also contemplated in this invention. For example, a resonance frequency and Q-factor of an 0402 resistor model from a specific manufacturer at a typical dimension of about 1 mm×0.5 mm×0.5 mm or a trace internal to an IC that has similar dimensions would occur at a wavelength around 1 mm or about 300 GHz, and would be measurably sensitive by this invention to the exact dimensions and internal metal to carbon composition physical construct interface and other features.

Another exemplary embodiment provides an array of transmit and or receive antennas.

Figure 8:
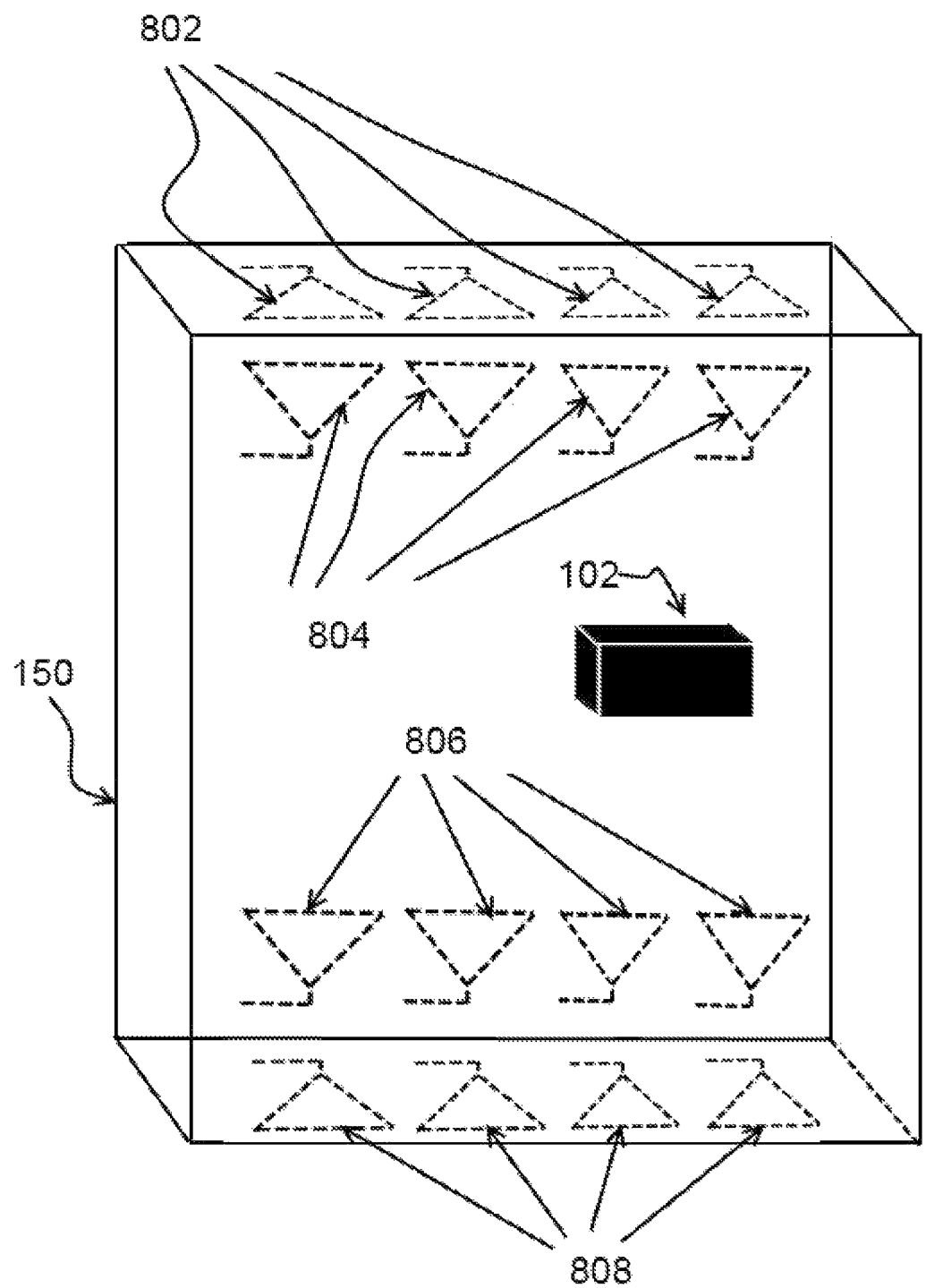
FIG. 8 shows an exemplary chamber containing a single antenna or an array of antennas positioned on various walls of the chamber for receiving and/or transmitting electromagnetic energy from/towards different directions.

FIG. 8 illustrates one example of antenna configurations, wherein the antenna enclosure 150 contains a single antenna or the array of antennas on one, several or all walls are shown for receiving and/or transmitting electromagnetic energy from/towards different directions to further enable differentiation and discern emission characteristics including emission orientation versus field strength versus polarization from the device 102 being tested, inspected and/or screened.

The antenna(s) 808 may transmit and/or receive electromagnetic energies towards or from the device 102, for further device analysis and discrimination processing by the invention. The antenna(s) 806 located on a separate opposite wall from the same wall as antenna(s) 804 serve to function in the same manner as the antenna(s) 808. The antenna(s) 802 on a different wall from all others also serve to function in the same manner as other antennas. The specifically chosen location, orientation, polarization, and/or response frequency characteristics of the differing antennas serve to offer differing electromagnetic energies as input for analysis by the instant invention. Possible benefits derived from these multiple antenna arrangements include but are not limited to noise-cancelling capabilities, electromagnetic energy acquisition at different polarizations, uneven illumination of the device 102 circuit regions for region activation discrimination to specifically influence one region more so than another, enhancing, reducing or utilizing multipath reflections with the chamber to selectively influence some regions of circuitry within the device 102 more than others, determine direction of emission of an unintentional frequency or group of phase or harmonically associated frequencies from the device 102, be used as separate inputs into separate receivers which are then integrated to reduce noise in common to said receivers, and/or be used as loading elements to modify, enhance and/or reduce the response characteristics of the chamber at desired frequencies. The antennas or antenna arrays 808, 806, 804, and 802 may be transmit, receive or both transmit and receive.

Figure 9:
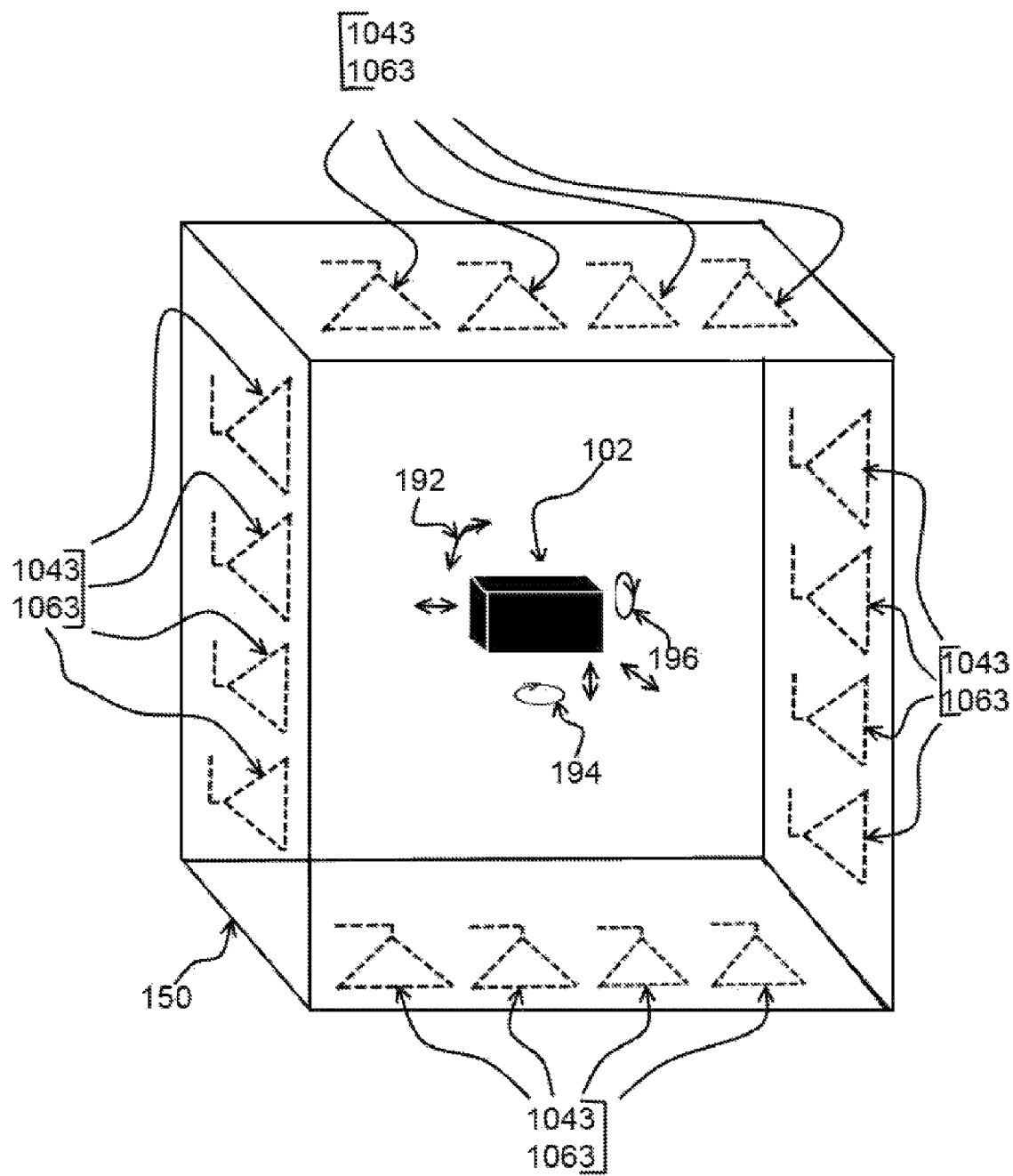
FIG. 9 shows an exemplary chamber containing a single antenna or an array of antennas positioned on various walls of the chamber for receiving and/or transmitting electromagnetic energy from/towards different directions and an electrical and/or electronic device capable of being oriented (or changing orientation of) at any angle with respect to all 3 axes, as well as being located or moved to any location within the chamber.

FIG. 9 illustrates another example of the antenna array, wherein the antenna enclosure or chamber 150 containing a single antenna or an array of antennas positioned on various walls of the chamber 150 for receiving and/or transmitting electromagnetic energy from/towards different directions and the device 102 capable of being oriented (or changing orientation of) at any angle with respect to all 3 axes, as well as being located or moved to any location within the chamber. The antenna(s) 1043, 1063 may transmit and/or receive electromagnetic energy s towards or from the device 102. For further analysis and discrimination processing of the re-emitted energy, the device 102 may be oriented and located in space at a continuous variety of locations within the antenna enclosure or chamber 150.

The antennas shown may be identical, different in orientation, polarization angle or type, different in frequency response, and/or different in design principles (horn, dish, Yagi, stripline, log-linear, monopole, dipole, etc.).

Figure 10:
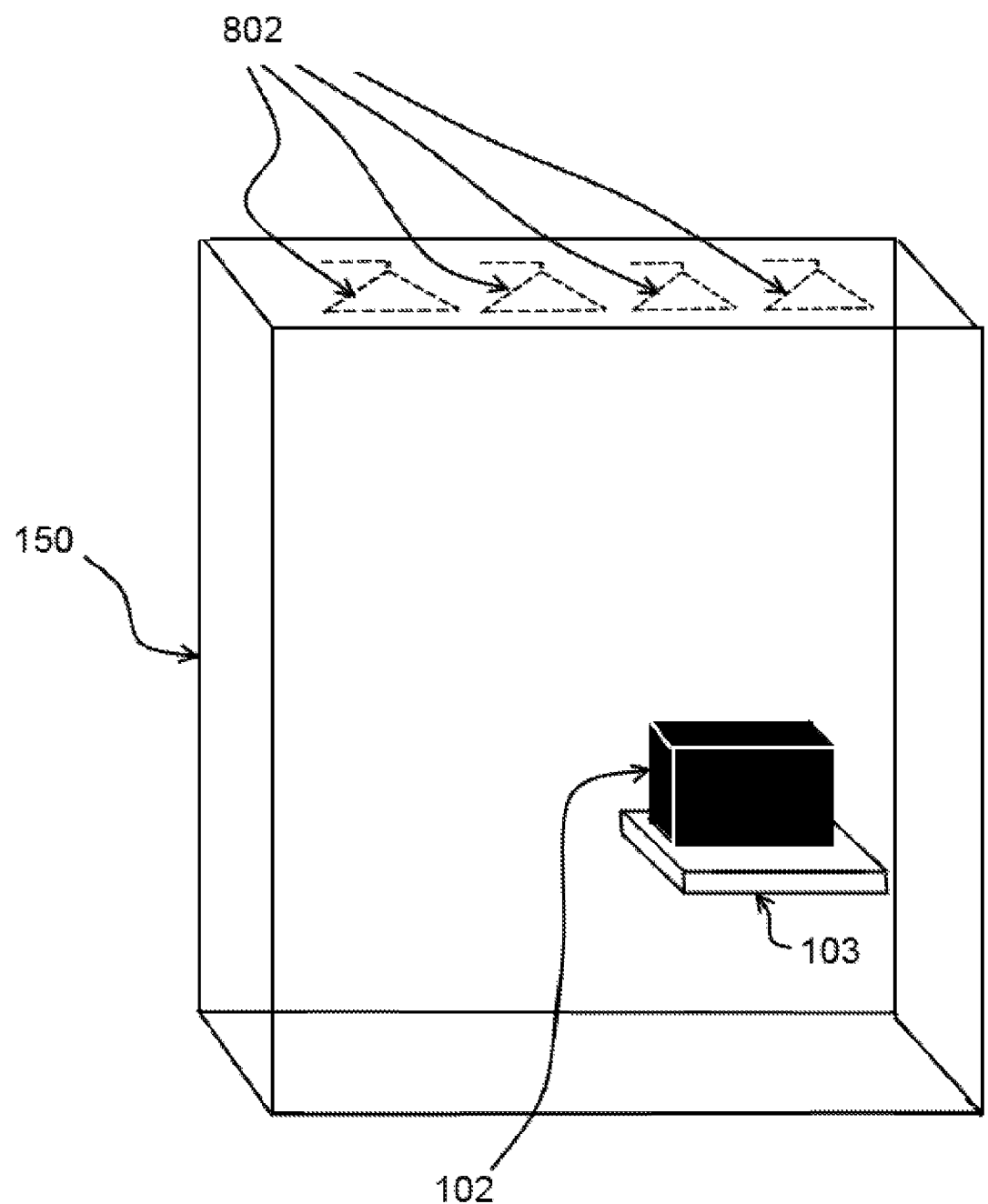
FIG. 10 shows an exemplary chamber containing a single antenna or an array of antennas on one wall of the chamber for receiving and/or transmitting electromagnetic energy from/towards the device contained therein.

FIG. 10 illustrates another example of the antenna array, wherein a single wall is shown as integrating an array of antennas 802 to receive and/or transmit electromagnetic energy from or to the device 102. The antennas 802 and device 102 are contained behind the walls within the antenna enclosure or chamber 150, as is the case in most exemplary embodiments, and is shielded physically and preferably electromagnetically from RF noise external to the walls of the antenna enclosure or chamber 150. Hence the wall of the antenna enclosure or chamber 150 is manufactured from an electrically conductive material. Also seen in FIG. 10 is a test fixture 103 which can be constructed or configured in a number of possible embodiments. Some examples of an inert fixture 103 serve only to physically support the device 102 and register or locate it properly and consistently in the same location and orientation in the space within the chamber. Other examples of the fixture 103 provide an operational signal to the device 102, such as power, clock and/or ground. The exemplary fixture 103 may also hold and release the device 102 to ensure its relative physical location is maintained relative to the overall apparatus throughout measurement, movement of the apparatus or while under vibration. The exemplary fixture 103 may only provide pull-up or pull-down voltages on select device 102 input or output lines. Although the exemplary embodiments are operable with no additional power or circuitry to the device 102, it is contemplated here within that the device 102 may be inserted into a circuit provided by the fixture 103 so as to receive such operational signal and/or pull-up or pull-down voltages.

Figure 11:
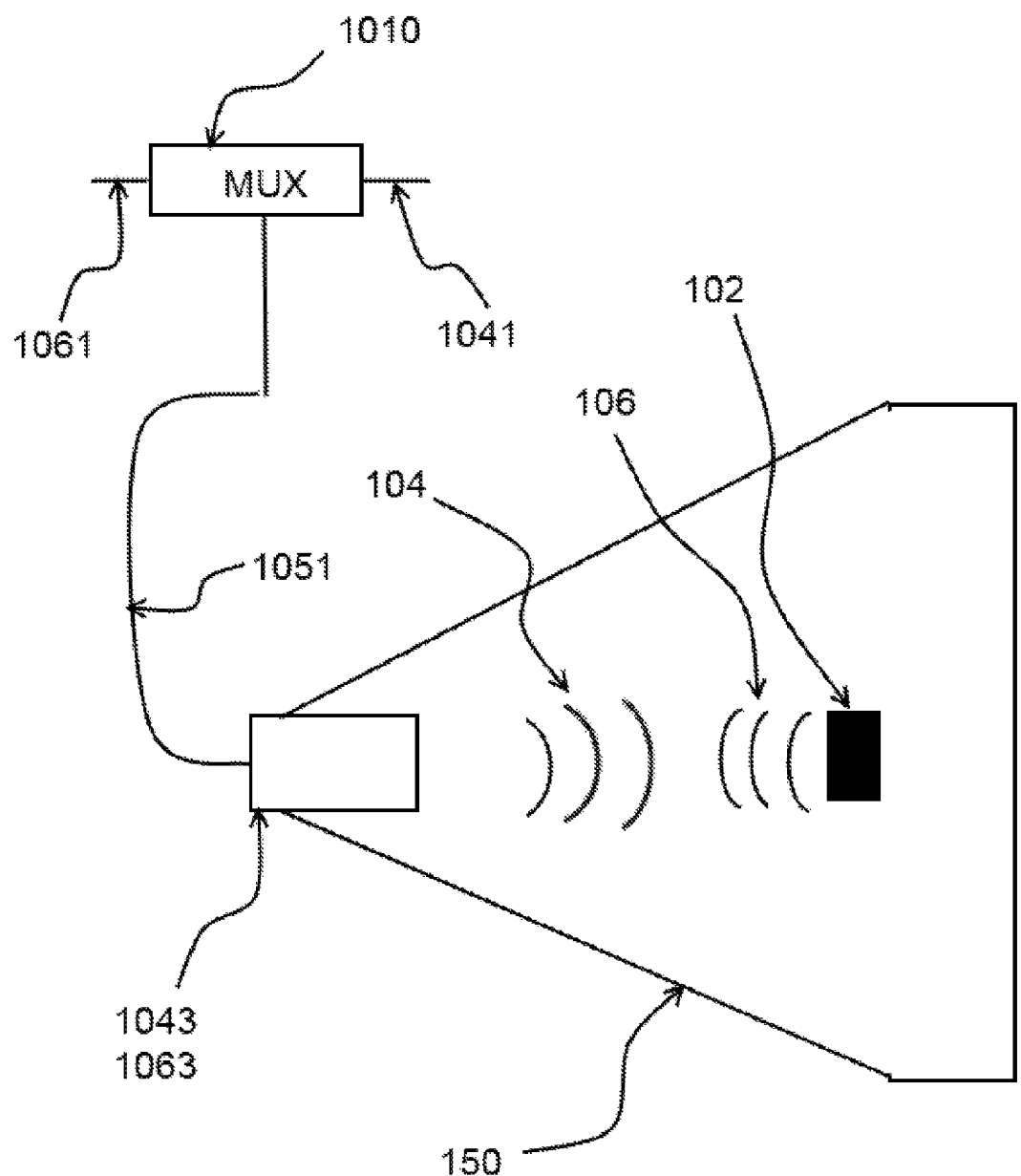
FIG. 11 shows an exemplary chamber and/or and IAE wherein a single antenna and a multiplexer are used to separate transmit and received frequencies in time and/or frequency to then be coupled to a transmit coax transmission line and a receive coax transmission line.

FIG. 11 illustrates a single antenna 1043/1063, shown as both transmitting electromagnetic energy 104 and receiving emissions 106 from the device 102. The wall(s) of the chamber 150 may be electrically conductive to form a shield from external noise, and is thus an antenna enclosure which is an RF shielded enclosure integrated as or integrally with an antenna as an antenna and enclosure or an IAE. The transmit electromagnetic energy can be coupled through a multiplexer 1010 which keeps the transmit frequencies separate from the receive frequencies, and/or can be seen as a frequency filter component, and may be comprised of a bulk element filter. The multiplexer 1010 may instead or additionally separate the electromagnetic energy in the time domain, or in a time interleaved fashion. Specifically, the transmit frequency(s) from coax transmission line 1041 are attenuated to the highest degree possible in the coax receive line 1061, while the electromagnetic energies are combined to coexist in the common coax line 1051 which conveys transmit frequencies to the antenna 1043 and conveys receive frequencies from the antenna 1063 which comprises the same antenna device. The multiplexer 1010 may be also configured and operate to prevent or minimize the received frequencies from being lost into the transmit circuit by passing down line 1041. The antenna conductor adjacent the wall(s) of the chamber 150 can use transmission line effects between the chamber wall and antenna element to generate an equivalent far field measuring capacity within the chamber and develop a region of enhanced EM sensitivity or 'sweet spot' in the chamber which is typically used as the location to position the device 102 for maximum gain and signal capture. The tapered shape of the chamber 150 in FIG. 11 is thus seen as one exemplary optimized shape and configuration for signal capture from the device 102.

Figure 12:
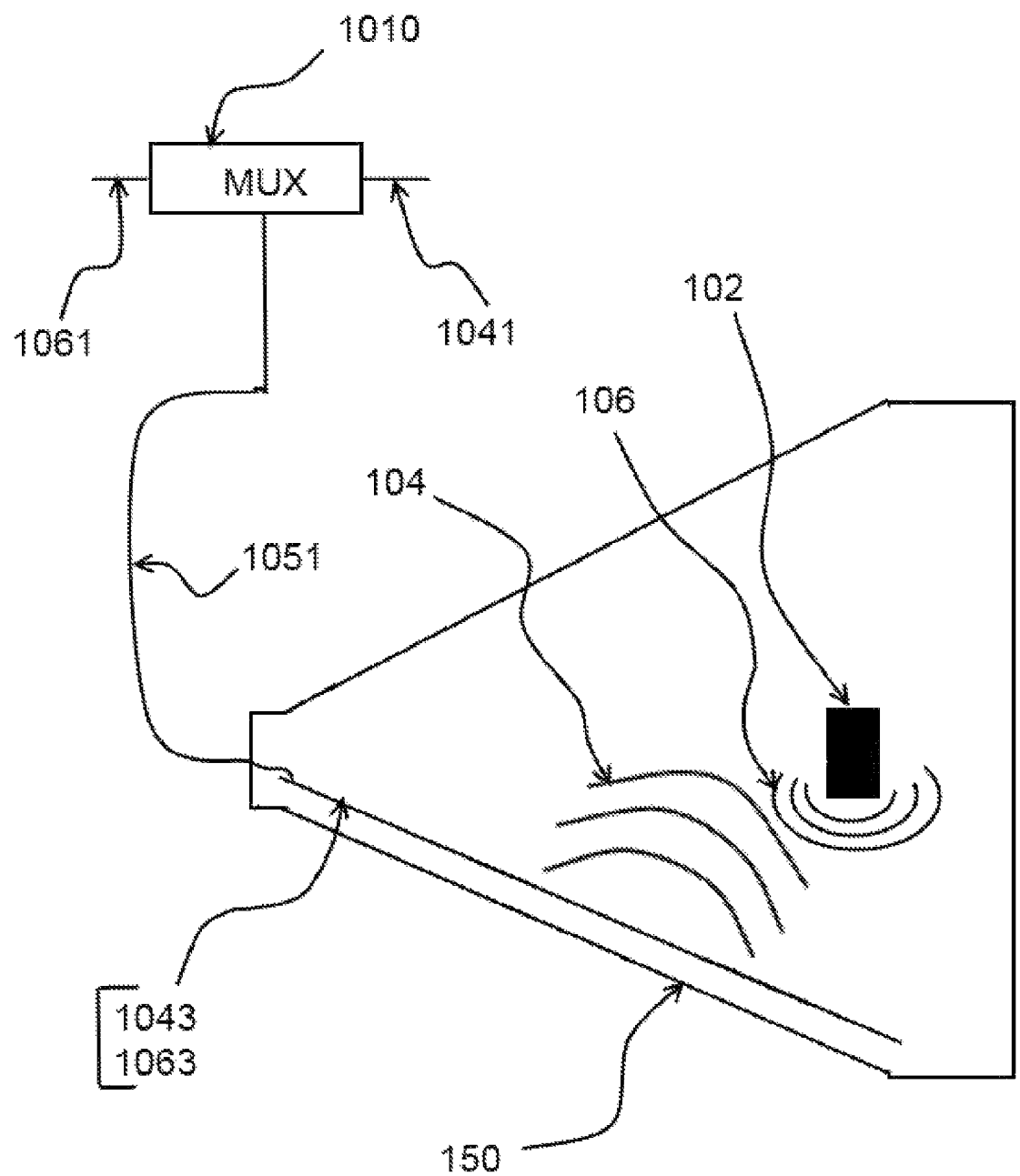
FIG. 12 shows an exemplary chamber similar to FIG. 11 but differing in the location of the antenna along at least one wall of the chamber.

FIG. 12 illustrates another exemplary embodiment, wherein the antenna 1043/1063 is integrated into the enclosure 150. Such integrated antenna enclosure is seen as externally operating in a similar fashion with the components 1061, 1041, 1010, 1051 and 150 seen in FIG. 11. A difference is the antenna location, operation, features and capability of the combined antennas 1043 and 1063 adjacent to the conductive wall of the enclosure. This can be seen as functionally and/or structurally similar to a GTEM cell, being replaceable by a GTEM cell, or functionally substantially equivalent to or comprising a GTEM cell.

Figure 13:
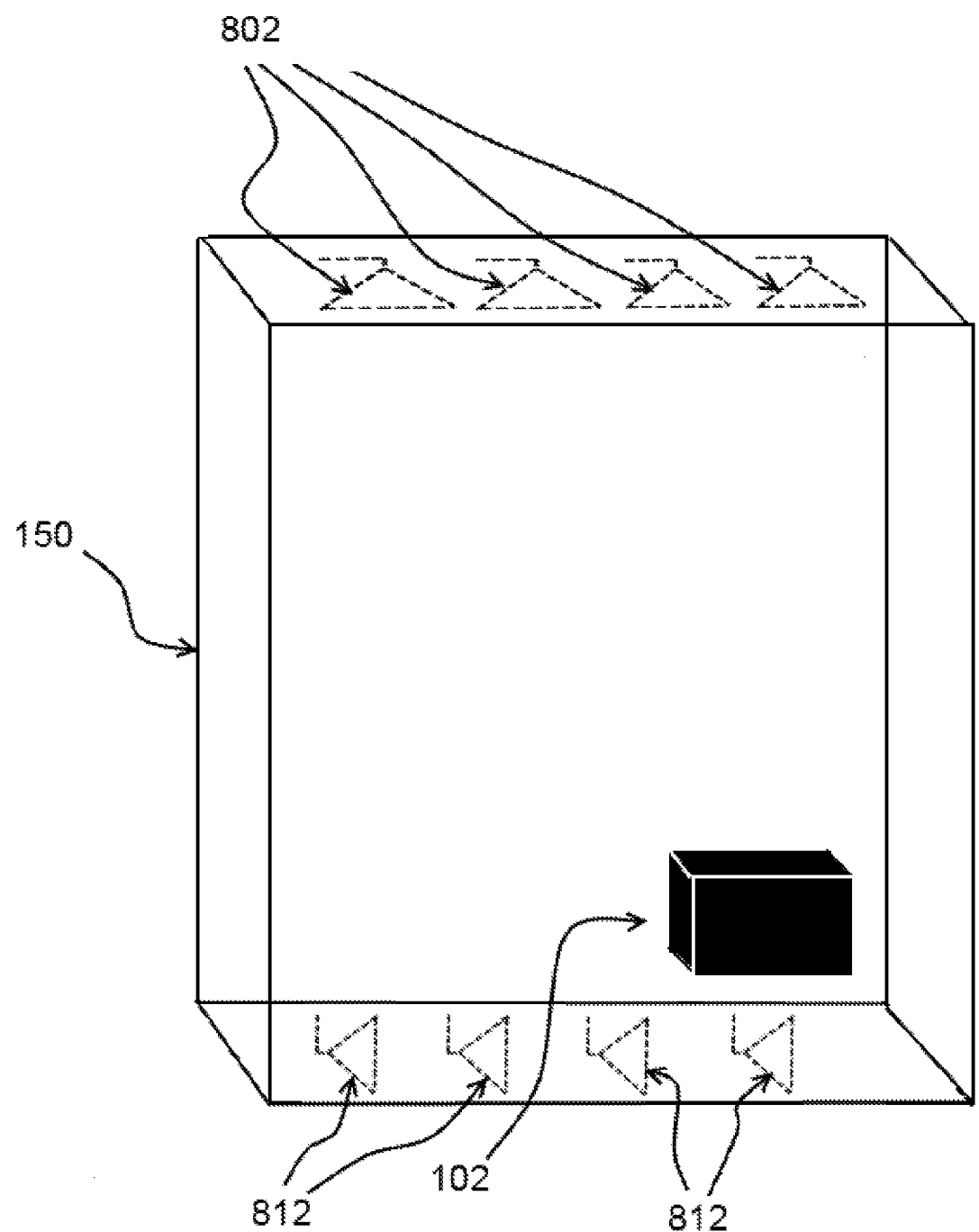
FIG. 13 shows an exemplary chamber wherein the antennas along one wall for transmit, receive or both transmit and receive are of a polarization 90 degrees rotated from the antennas along a second wall for transmit, receive or both transmit and receive.

In FIG. 13, the enclosure 150 is seen with antenna(s) 802 of one polarization for transmit, receive or both on one wall and antenna(s) 812 to transmit, receive or both with a different polarization, preferably 90 degrees rotated on a preferably opposite wall. The transmit electromagnetic energy is transmitted towards the device 102 which receives or absorbs the transmitted frequency(s) energy and re-radiates electromagnetic energy at other frequencies, potentially other polarizations, other locations, other orientations, other energy dB levels, other harmonic relationships, phase relationships, and/or other characteristics.

Figure 14:
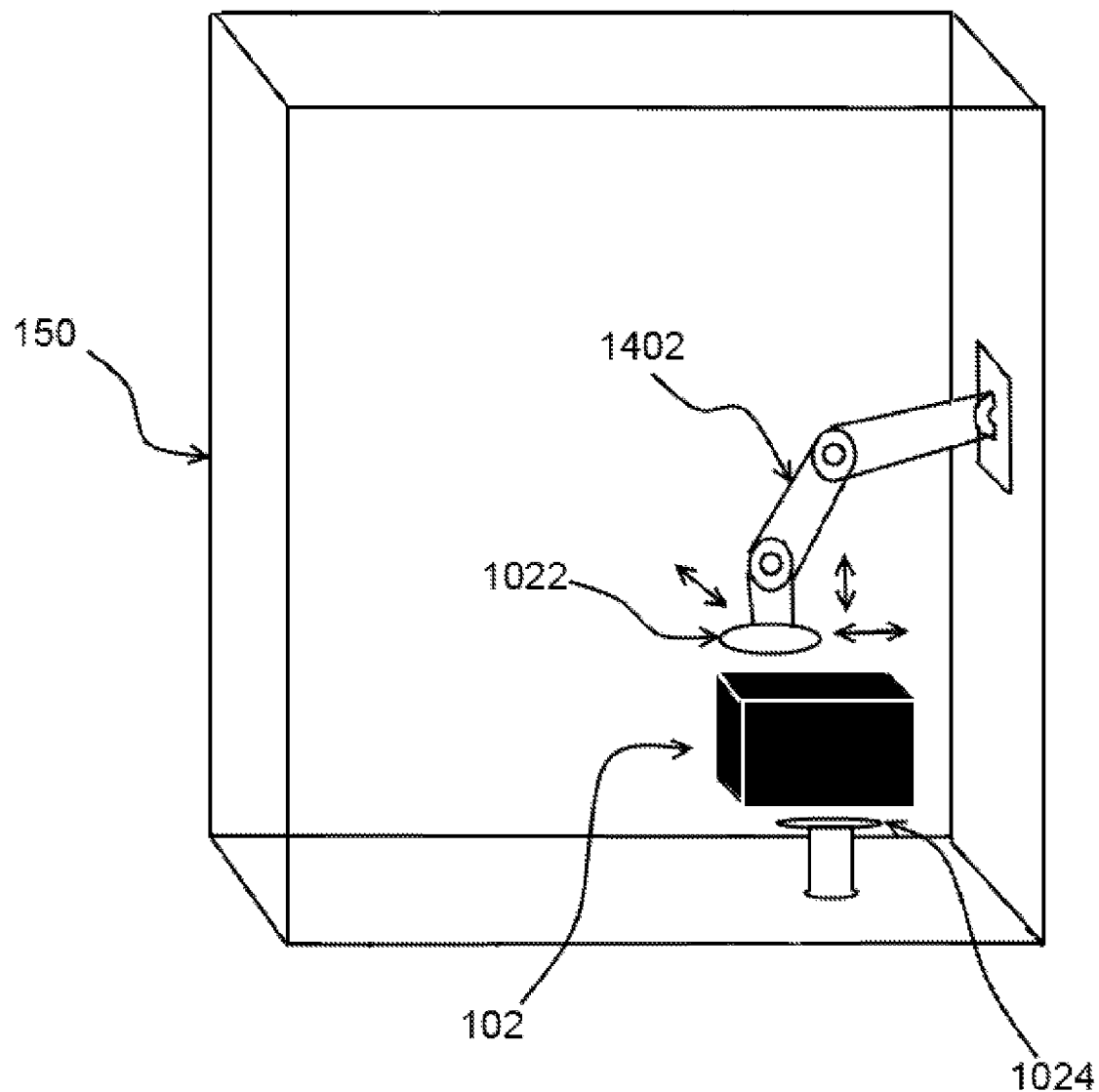
FIG. 14 shows an exemplary chamber wherein a robotic arm is used to place or manipulate an antenna, a field probe, a capacitive e-field coupling probe, a near field antenna or a far-field antenna for EM pattern capture or illumination at one or more locations for analysis by the invention. An optional second fixed antenna is also seen adjacent the device to be measured. Either or both antennas may be receive, transmit or both.

FIG. 14 illustrates the enclosure 150 containing a robotic or manually adjustable arm 1402 for locating or manipulating an antenna, near-field probe, near-field antenna, field probe, capacitive pickup, inductive pickup, hall-effect device, thermistor, or other sensor 1022 near or adjacent the device 102 to acquire energy patterns and especially RF energy emissions from the device 102. The arm 1402 may be positioned, moved or manipulated to different locations on the device 102 to gather emission from those locations specifically or to compare the emissions from those locations with emission from other locations, up to and including a raster sweep of the whole device or multiple such whole device raster sweeps performed while the device 102 is illuminated by or examined at different frequencies. Additional transmit and/or receive antenna or electrical/electromagnetic/magnetic/thermal energy transfer device 1024 located near, adjacent or opposite the sensor 1022 and/or the device 102 are also contemplated herewithin. This energy transfer device 1024 may be configured and operable to illuminate the device 102 with EM energy at a specific frequency or set of frequencies, for example, again, typically different from the received frequencies at sensor 1022.

Figure 15:
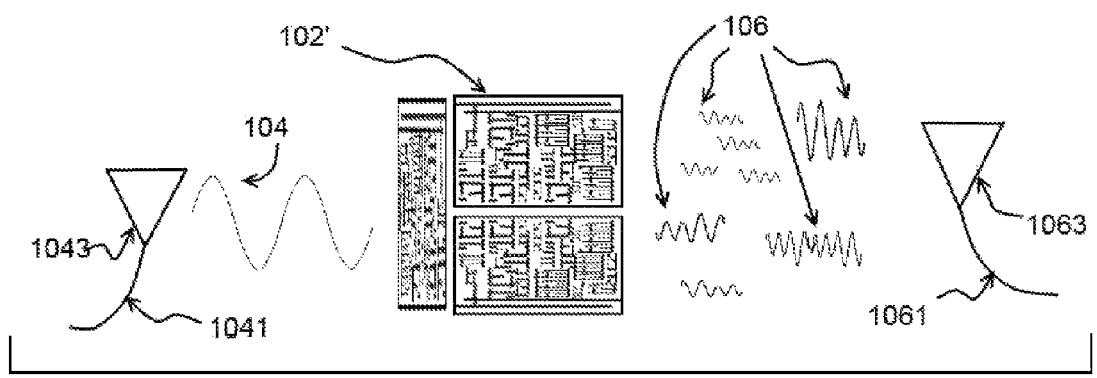
FIG. 15 shows a more detailed representation of a device under test, a typical illumination input signal and resultant illumination output signals of varying waveform, frequency and amplitudes.
Figure 16A:
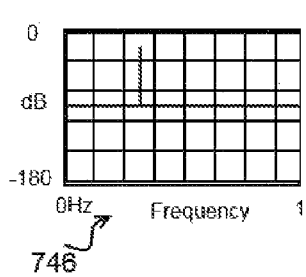
Figure 16B:
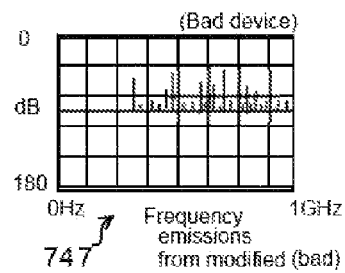
Figure 16C:
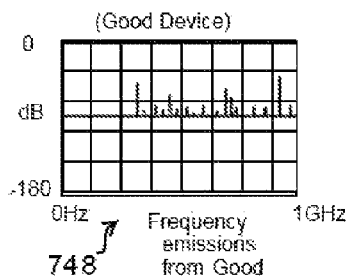

Now in reference to FIGS. 15-16c, therein is shown an exemplary waveform 104 emitted from illumination or transmit antenna 1043 and illuminating device 102' which then re-emits the resulting far more complex waveform signals 106 at many frequencies and amplitudes resulting from the interactions of the electrical features contained within 102'. The spectrum 746 in FIG. 16*a* shows a display of a typical single frequency illumination frequency in the frequency domain versus power measured in decibels (dB), while the spectrum 748 in FIG. 16*c* shows a display of an exemplary multiple frequency results being emitted from device 102' in the frequency domain versus dB. Spectrum 747 in FIG. 16*b* shows an exemplary bad or modified set of multiple frequency result artifacts generated if device 102' is Bad or modified.

It should be noted that the makeup or nature of the device 102 may be but not limited to and considered as the circuit design with associated lead lengths of gates within the ICs, lead orientation, location, or metallic composition, gate semiconductor composition characteristics including doping levels, gate sizes, gate configuration relative to other gates or interconnect leads, and gate junction bonding characteristics, as well as the interconnect configurations utilized in defining the operational logic. The makeup or nature of the device 102 also includes the correct, desired or incorrect, undesired nature of the firmware or hardware embodied in the device. Any or all of these factors interact and contribute to the resulting unintentional re-emissions from the device under test, which are measured and discernable by the instant invention.

An analysis of a known good (in a strict compliance with applicable standards) device 102 may be initially performed using any of the above described embodiments to develop a waveform typically at one specifically chosen frequency estimated to be effective at creating discriminating authenticity frequency artifacts, based on the operating frequency of the device 102, which is then transmitted towards the device 102, and a subsequent characteristic signature of characteristic EM features such as frequency peak locations and relative dB values to each other are then received. Next, the known good characteristic signature is subsequently typically compared against devices of unknown authenticity. If the comparison yields a measurement of difference beyond a threshold of unacceptable variation, the device 102 may be quarantined, rejected or destroyed. The invention may issue a good/bad signal electrically and/or issue a communication to an operator GUI as a typical final act to indicate and/or complete the disposition of the tested device 102. The illumination waveform frequency and resulting exemplary signature of the device 102 on a known good device 102 serves as a basis of association, evaluation and comparison for future use to determine authenticity of parts of a known part number and type. A set of parts and their associated illumination waveforms and resulting signatures is stored and retrieved (typically in a database) when a new part of known part number arrives to be tested. The part matching or most closely matching the part number to be tested is found in the stored set (typically in said database) and its associated illumination waveform, frequency, signature and parameters are used to illuminate and analyze by comparison the new device 102 to be tested.

In many of the above described exemplary embodiments, apparatus 100, 450 is configured and operable to simultaneously illuminate the device 102 and collect its characteristic responses to illumination to non-destructively determine authenticity of the device 102 and identify any subversive modifications made to the part. Assessment of electronic components can be made in real-time (no post-processing typically required as the entire processing typically takes place in one or more embedded processors that resides within the apparatus) and usable by an operator nearby typically with minimal training. The apparatus 100, 450, as a tool, is applicable to a wide range of device types and sizes and typically be able to detect multiple types of typical and sophisticated counterfeit modalities.

One instantiation of the invention however, can transmit the received re-emissions in digital or analog form for processing at another location. One instantiation of the invention uses near-field antenna means. One instantiation of the invention uses far-field antenna means. One instantiation of the invention uses both near-field antenna and far-field antenna means for at least one of the transmit antennas and receive antennas. One instantiation of the invention uses a plurality of antenna combinations in near-field and/or far-field for the at least one of the transmit antennas and receive antennas.

In one exemplary embodiment, the transmitted energy is at one frequency and the received re-emitted energy from the device 102 is at a different frequency.

In another exemplary embodiment, the receive and transmit frequencies are the same.

In another exemplary embodiment, a filter is applied on the transmit chain to allow only the transmitted electromagnetic energy at one or more frequencies to illuminate the device 102 and/or another set of filters is applied to the receive chain to collect only the frequencies meant to receive and to block the transmit frequencies.

In another exemplary embodiment, the transmitted frequency is at multiple frequencies and the received re-emitted energy from the device being tested is at one or more frequencies the same or different from the transmitted frequency.

In another exemplary embodiment, the transmitted polarization is of one orientation or type and the received re-emitted energy from the device 102 is at a different polarization or type.

In another exemplary embodiment, the transmitted polarization is of one orientation or polarization type and the received re-emitted energy from the device 102 is received using means (typically an antenna) to capture RF energy at the same or different polarization or type.

In another exemplary embodiment, the transmitted angle with respect to the device 102 or its ground, internal trace plane, or power plane is at one angle (or two composite Euler angles making one overall angle) and the received re-emitted energy from the device 102 is at a different angle or angles.

In another exemplary embodiment, multiple transmit antennas are used to transmit power from different or similar frequencies, locations, orientations, or polarizations, and multiple receive antennas are used to receive power from different or similar frequencies, locations, orientations or polarizations to typically determine the dB profile in surrounding space of re-emitted RF radiation.

In another exemplary embodiment, the dB value at the polarization of the received emission is used as one of typically many discrimination factors.

In another exemplary embodiment, the delay time of the received electromagnetic energy is again used as one discrimination factor.

In another exemplary embodiment of the invention, the antenna location and/or orientation of the received antenna and/or the transmit antenna is again used as one discrimination factor. In one embodiment of the invention the phase of the received emission is used as one discrimination factor.

In another exemplary embodiment of the invention, at least one of, a plurality of, or all of the factors including polarization, dB level, frequency, phase, RF re-emission angle, RF excitation angle, and delay time of the at least one received emission and/or the at least one of the RF excitation emission is used as a discrimination or control factor.

Some exemplary embodiments, in some operational modes, act as a non-contact time-domain reflectometer in the time domain, as an alternative or in addition to its analysis in the frequency domain. In this way, the transmitted RF energy may comprise a broad spectrum electromagnetic pulse or series of such pulses of a specific amplitude envelope, duration, number and/or repetition rate, and the received energy would be analyzed in the time domain to discern path lengths for example, within the device 102.

The hardware and firmware architecture can be integrated in the exemplary embodiments. The transmit means (such as an antenna) can be chosen based on the waveform and illumination parameters to be generated based on the device or devices known to be (by GUI entry for example) or expected to be present or under test. The transmit means can typically be reconfigured to provide illumination in or throughout the RF frequency band. The transmit means in one embodiment can be developed in a digital format such as on a computational device such as an FPGA, DSP or microprocessor. It is then converted to analog form using a circuit means such as a digital to analog converter. It is then amplified to the appropriate power level and typically launched through the antenna for illumination of the device 102. The device 102 then absorbs the electromagnetic energy. Unlike radar, the absorbed energy that is then re-emitted and then collected is at a different frequency from the illumination frequency. The non-linear effects which can be present within semiconductors or other devices cause emissions to not necessarily be at the same frequency as the illumination frequency. An antenna typically of the broadband type is used to collect the re-emitted energy. The collection means is configured to collect the electromagnetic energy that is re-emitted by the device being tested over the RF band. The electromagnetic energy can be then processed to determine if any anomalies are present in the device. In an exemplary embodiment the received energy is in an analog form and is digitized through the use of a means such as an analog to digital converter. The digitized data is then processed using digital signal processing techniques typically employed by the Inventor in his previous inventions and the processed data is then converted, scrutinized and/or analyzed by a signature recognition means which is typically a pattern analysis and comparison software algorithm to determine if the device 102 has any or significant anomalies present.

The transmit and receive antenna(s), associated hardware and software can function simultaneously with illumination, directly after illumination, interleaved between illumination periods, and/or without illumination. Some exemplary embodiments operate either when power is applied to the device 102 or when the device 102 is not powered. The apparatus 100, 450 may be configured for quality control of piece parts to detect counterfeit electronics or compromised electronic components.

The apparatus 100, 450 may be configured to collect and process the re-emissions from the device(s) 102 that are generated after illuminated waveform is absorbed by the circuitry of the device(s) 102. The apparatus 100, 450 may be also configured to collect the reflected waveform from the device(s) 102 in a radar mode. Either one or both reflected (radar mode) and re-emitted energy can be analyzed to determine a state or a condition of the device 102, which may be an authenticity of such device 102.

In another exemplary embodiment device(s) 102 can be tested on fully populated circuit boards.

In one exemplary embodiment, the apparatus 100, 450 may be configured such that at least one of the authenticity, modified, unmodified, or correct configuration of the device 102 results conveyed in at least one of an electrical, auditory or optical signal is sent or an action being taken.

In another exemplary embodiment, the apparatus 100, 450 may be constructed to provide an analysis tool that is comprised of at least one antenna, at least one RF source, at least one RF receiver and at least one RF pattern processing means and at least one electronic device wherein the RF source transmits RF energy thru the antenna towards the electronic device, the electronic device reradiates at least one of unintentional and unintentional characteristics of intentional RF energy back towards the at least one antenna for reception, and the RF pattern processing means such as dedicated pattern recognition software algorithms uses the received RF energy as a basis to determine the modified or unmodified nature of the electronic device.

In another exemplary embodiment, the apparatus 100, 450 may be configured such that the received electrical emission(s) is (are) analyzed in at least one of the time domain and the frequency domain.

In at least one exemplary embodiment, the Rx and Tx utilize the same input connector or penetration on a chamber wherein the Rx frequency, fRx, is continuous throughout the collection band and the Tx frequency, fTx, is a filtered away from the Rx path such that the Rx bandwidth is defined by $$fRx\text{min to } fTx{-}fTx \text{ and } fTx{+}fTx \text{ to } fRx\text{max},$$

wherein fTx+/−fTx is the bandwidth of the Tx filter.

In one example, fTx may be less than Tx/10.

Those skilled in the art would understand that though the exemplary embodiment describes a bandpass filter for the Tx energy, a low pass filter or a high pass filter could also be utilized. It is contemplated herewithin that the Tx electromagnetic wave can have any number of complex frequency or time domain modulations or waveforms that may be steady state or varied to generate unique responses from the electrical device or devices being tested. Those skilled in the art will recognize a wide range of modulations or waveforms that can be utilized for this purpose. Further, a sequence of tests at specific different illumination frequencies and resultant artifacts may be performed and analyzed and considered or combined to be a single test.

In at least one exemplary embodiment, multiple Tx bands are utilized wherein each Tx band may have identical, similar, or varying modulations or waveforms applied to the device being tested.

In at least one exemplary embodiment, the Tx frequency may be swept across the Rx band while the receiver and processing elements continuously collect, measure and analyze the emissions from the device being tested with a sweeping filter being applied to prevent the Tx frequency from interfering with the receipt, measurement and processing of emission artifacts or signatures. Those skilled in the art will recognize that filtering techniques used to isolate a transmit signal from a received signal in the communications field can be used to isolate the transmit signal from the received emission artifacts.

In another exemplary embodiment, the Tx frequency or wavelength is applied completely outside of the Rx bandwidth.

In a further exemplary embodiment the Tx frequency applied is selected specifically to correspond to the structures of the electrical device under test such as the pins of an electronic component, traces within an IC, traces on a circuit board or the length or width dimensions or some other physical characteristic of an electrical device being tested to maximize the Tx energy coupled into the device being tested. To those skilled in the art to optimize the coupling the Tx frequency could be selected to be full wavelength, half wavelength, quarter wavelength or any wavelength multiple to facilitate favorable coupling of Tx energy into the device being tested to produce re-emission artifacts for collection, measurement, processing and analysis of the Rx chain of the subject invention.

In another exemplary embodiment, the invention's receiver focuses on a narrow bandwidth or limits the total bandwidth received to a more limited bandwidth and conducts additional processing using the available processing assets on areas of exploitable emission artifact content to further pull out exploitable artifact features from the data.

In a further exemplary embodiment, multiple discrete Rx sub-bands are identified to conduct additional processing on while the Tx signal is off, on, swept through the Rx emission artifact collection band or a combination of off, single frequency Tx, multiple frequency Tx or swept Tx is applied. Simultaneously, the emission artifact collection, measuring, processing and analysis apparatus collects, measures, processes and analyzes the received emission artifacts.

In a further exemplary embodiment, where certain parameters require a larger Tx bandwidth or timing protocols between the Tx and Rx may be used the bandwidth of the Tx filter may be up to 50% of the Rx bandwidth or even 100% of the bandwidth where timing or other protocols are used to prevent the interference between the Tx signal and the receiver that is collecting the Rx emission artifacts.

The above described exemplary embodiments can be used for detecting counterfeit electronic parts, quality control tests, detecting modified parts, detecting malicious circuitry, for cyber physical security and detecting malicious code, since such exemplary embodiments instantaneously, temporarily or permanently change, measure or scrutinize the unintentionally generated EM artifacts and/or the resulting signatures, and not generated by design, by internal circuitry of hardware or virtual hardware circuits inside programmable logic, boards, ICs or systems.

Some of the various exemplary embodiments influence pre-existing devices to a wide range of degrees, especially while the devices are under operation ranging from undetectable to the device under test, to specific selected change in RF emission influences of specific hardware design choices and features, subsystems or components, to complete disablement of the operating device, to permanent disablement of the device.

In one exemplary embodiment, therein is provided an apparatus configured and operable to determine a state and/or condition of an unpowered electrical device, wherein the apparatus comprises a waveform generator generating a waveform; a first antenna transmitting electromagnetic energy containing the waveform in a direction of the electrical device; a second antenna receiving artifact(s) unintentionally re-emitted from the electrical device due to excitation thereof with the waveform; one or more processors; and computational instructions that cause the one or more processors to perform the steps of: develop a signature of the electrical device, wherein the signature contains the artifact(s), analyze the developed signature, and determine the state and/or condition of the electrical device based on artifact(s) present in the signature.

In another exemplary embodiment, therein is provided an apparatus configured and operable to prevent or determine a cyber physical security threat, wherein the apparatus comprises a waveform generator generating a waveform; a first antenna transmitting electromagnetic energy containing the waveform in a direction of the electrical device; a second antenna receiving artifact(s) unintentionally re-emitted from the electrical device due to excitation thereof with the waveform; one or more processors; and non-transitory tangible computer readable medium containing executable and/or computational instructions that cause the one or more processors to perform the steps of: developing a signature of the electrical device, wherein the signature contains the artifact(s), analyzing the developed signature, and determining the state and/or condition of the electrical device based on artifact(s) present in the signature.

The step of analyzing the developed signature may include the step of comparing the developed signature against a baseline signature of a signature of a certified/good device.

In another exemplary embodiment, therein is provided an apparatus configured and operable to determine anomalies in unpowered electrical and/or electronic devices so as to prevent or determine a cyber physical security threat, wherein the apparatus comprises a waveform generator generating a waveform; a first antenna transmitting electromagnetic energy containing the waveform in a direction of the electrical device; a second antenna receiving artifact(s) unintentionally re-emitted from the electrical device due to excitation thereof with the waveform; one or more processors; and non-transitory tangible computer readable medium containing executable and/or computational instructions that cause the one or more processors to perform the steps of: developing a signature of the electrical device, wherein the signature contains the artifact(s), analyzing the developed signature, and determining the state and/or condition of the electrical device based on artifact(s) present in the signature.

The step of analyzing the developed signature may include the step of comparing the developed signature against a baseline signature of a signature of a certified/good device.

In another exemplary embodiment, therein is provided a method for preventing or determining a cyber physical security threat, wherein the method employs an apparatus comprising a waveform generator generating a waveform; a first antenna transmitting electromagnetic energy containing the waveform in a direction of the electrical device; a second antenna receiving artifact(s) unintentionally re-emitted from the electrical device due to excitation thereof with the waveform; one or more processors; and non-transitory tangible computer readable medium containing executable and/or computational instructions that cause the one or more processors to perform the steps of: developing a signature of the electrical device, wherein the signature contains the artifact(s), analyzing the developed signature, and determining the state and/or condition of the electrical device based on artifact(s) present in the signature.

The step of analyzing the developed signature may include the step of comparing the developed signature against a baseline signature of a signature of a certified/good device.

The chosen exemplary embodiments of the claimed invention have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the invention may be made by those skilled in the art without departing from the spirit and scope of the invention as set forth in the appended claims. Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6. Furthermore, the Abstract is not intended to be limiting as to the scope of the claimed invention and is for the purpose of quickly determining the nature of the claimed invention.

What is claimed is:

1. An apparatus for determining a state and/or a condition of an unpowered electrical device, comprising:
    a waveform generator generating a waveform;
    a first antenna transmitting electromagnetic energy containing said waveform in a direction of the electrical device;
    a second antenna receiving artifact(s) unintentionally re-emitted from the electrical device due to excitation thereof with said waveform;
    one or more processors; and
    non-transitory computer readable medium containing executable or computational instructions that cause said one or more processors to perform the steps of:
    developing a signature of the electrical device, wherein said signature contains said artifact(s),
    analyzing said developed signature, and
    determining the state and/or condition of the electrical device based on said artifact(s) present in said signature.

2. The apparatus of claim 1, further comprising a chamber and wherein the electrical device is disposed within said chamber during operation of said apparatus.

3. The apparatus of claim 2, wherein walls of said chamber are manufactured from an electrically conductive materials so as to shield the electrical device from external electromagnetic radiation.

4. The apparatus of claim 1, wherein said first and second antennas are integrated into a single antenna.

5. The apparatus of claim 4, wherein said single antenna is a horn shaped antenna and wherein said apparatus includes a base closing an open end of said horn shaped antenna and defining a chamber configured and sized to receive the electrical device therewithin during operation of said apparatus.

6. The apparatus of claim 5, further comprising a conveyor passing through said chamber so as to selectively position the electrical device within said chamber and remove the electrical device therefrom.

7. The apparatus of claim 1, further comprising a chamber, wherein the electrical device is disposed within said chamber during operation of said apparatus and wherein said first and second antennas are positioned within said chamber at different polarities relative to the electrical device.

8. The apparatus of claim 1, further comprising a chamber, wherein the electrical device is disposed within said chamber during operation of said apparatus and wherein each of said first and second antennas is an antenna array positioned on opposite walls of said chamber.

9. The apparatus of claim 1, wherein each of said first and second antennas is a horn-shaped antenna.

10. The apparatus of claim 9, wherein said first and second antennas are disposed opposite and in series with each other and wherein the electrical device is positioned between open ends of said first and second antennas.

11. The apparatus of claim 9, wherein said first and second antennas are disposed opposite and in series with each other, wherein open ends of said first and second antennas define a chamber and wherein said apparatus further includes a conveyor passing through said chamber so as to selectively position the electrical device within said chamber and remove the electrical device therefrom.

12. The apparatus of claim 1, wherein said waveform includes multiple frequencies.

13. The apparatus of claim 12, wherein said multiple frequencies are at least one of simultaneously and concurrently received at said second antenna and processed by said one or more processors.

14. The apparatus of claim 1, wherein said waveform is selected from a number of possible developed waveforms based on a type of the electrical device.

15. The apparatus of claim 1, wherein said artifact(s) includes a frequency shift.

16. The apparatus of claim 1, wherein said artifact(s) includes non-linear frequency features.

17. The apparatus of claim 1, further comprising a chamber, wherein the electrical device is oriented and located in space at a continuous variety of locations within said chamber.

18. The apparatus of claim 1, further comprising a chamber and a robotic or a manually adjustable arm mounted within said chamber.

19. The apparatus of claim 1, further comprising a multiplexer.

20. The apparatus of claim 19, wherein said multiplexer separates transmit frequencies from received frequencies.

* * * * *